(12) United States Patent
Qin et al.

(10) Patent No.: US 10,792,582 B2
(45) Date of Patent: Oct. 6, 2020

(54) WATER TREATMENT AND STEAM GENERATION SYSTEM FOR ENHANCED OIL RECOVERY AND A METHOD USING SAME

(71) Applicant: GREAT OCEAN LTD., Calgary (CA)

(72) Inventors: Henry Z. Qin, Calgary (CA); Wen Li Zhang, Calgary (CA)

(73) Assignee: GREAT OCEAN LTD., Calgary, Alberta (*) Notice: Subject to any disclaimer, the term of this patent is extended or adjusted under 35 U.S.C. 154(b) by 0 days.

(21) Appl. No.: 16/435,807

(22) Filed: Jun. 10, 2019

(65) Prior Publication Data
US 2019/0291020 A1 Sep. 26, 2019

Related U.S. Application Data

(63) Continuation of application No. 15/447,632, filed on Mar. 2, 2017, now Pat. No. 10,357,726, which is a
(Continued)

(51) Int. Cl.
*B01D 1/14* (2006.01)
*B01D 5/00* (2006.01)
(Continued)

(52) U.S. Cl.
CPC ............... *B01D 1/14* (2013.01); *B01D 5/006* (2013.01); *B01D 5/0075* (2013.01); *B01D 17/0214* (2013.01); *C02F 1/04* (2013.01); *F16T 1/00* (2013.01); *F22B 29/06* (2013.01); *F22B 37/486* (2013.01); *C02F 1/041* (2013.01);
(Continued)

(58) Field of Classification Search
CPC .... C02F 1/04; C02F 1/041; C02F 1/06; C02F 1/14; C02F 1/40; C02F 2001/5218; C02F 2101/325; C02F 2303/22; F16T 1/00; B01D 1/14; B01D 17/0214; B01D 5/006; B01D 5/0075; F22B 37/486; F22B 29/06; F22B 1/16
See application file for complete search history.

(56) References Cited

U.S. PATENT DOCUMENTS

| | | | | |
|---|---|---|---|---|
| 8,158,097 B2* | 4/2012 | DiTommaso | ........... | C02F 1/048 210/702 |
| 2012/0144830 A1* | 6/2012 | Ellert | ........................ | F22D 1/50 60/641.8 |
| 2015/0345277 A1* | 12/2015 | Schooley | ............... | C09K 8/592 166/267 |

* cited by examiner

*Primary Examiner* — Jonathan Miller
*Assistant Examiner* — Gabriel E Gitman
(74) *Attorney, Agent, or Firm* — Daniel Polonenko

(57) ABSTRACT

A system of generating steam from an emulsion stream produced from a reservoir via thermal recovery has a heat exchanger for adjusting the emulsion to a first temperature; at least one separation device for separating water from the emulsion at the first temperature to obtain produced water; an optional produced-water preheater, and a high-pressure evaporator for receiving the produced water and generating steam using the produced water. The evaporator has a vapor drum; a heating element receiving the water stream, and in fluid communication with the vapor drum via a pressure letdown device; a heating source for imparting sensible heat to the water stream for generating steam. The evaporator also includes a recirculation pump for circulation of blowdown concentrate, and a bubble generator for generating bubbles and injecting generated bubbles into the heating element to enable self-removal of scales and other solid deposits in the evaporator.

9 Claims, 13 Drawing Sheets

Related U.S. Application Data continuation-in-part of application No. 15/215,714, filed on Jul. 21, 2016.

(51) Int. Cl.
*F22B 29/06* (2006.01)
*B01D 17/02* (2006.01)
*F22B 37/48* (2006.01)
*F16T 1/00* (2006.01)
*C02F 1/04* (2006.01)
C02F 1/52 (2006.01)
C02F 1/06 (2006.01)
C02F 1/14 (2006.01)
C02F 1/40 (2006.01)
C02F 101/32 (2006.01)
F22B 1/16 (2006.01)

(52) U.S. Cl.
CPC .................................. *C02F 1/06* (2013.01); *C02F 1/14* (2013.01); *C02F 1/40* (2013.01); *C02F 2001/5218* (2013.01); *C02F 2101/325* (2013.01); *C02F 2303/22* (2013.01); *F22B 1/16* (2013.01)

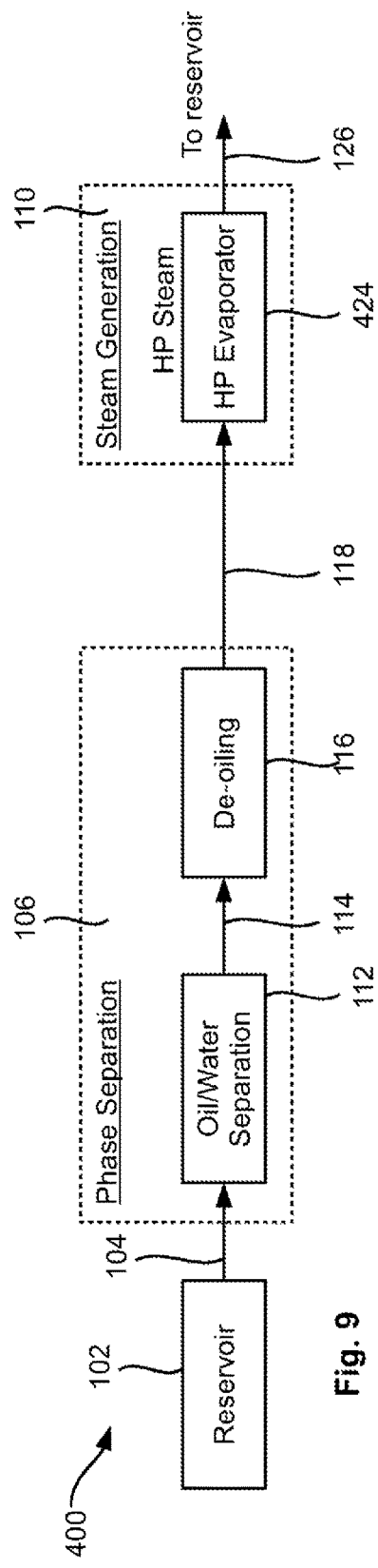
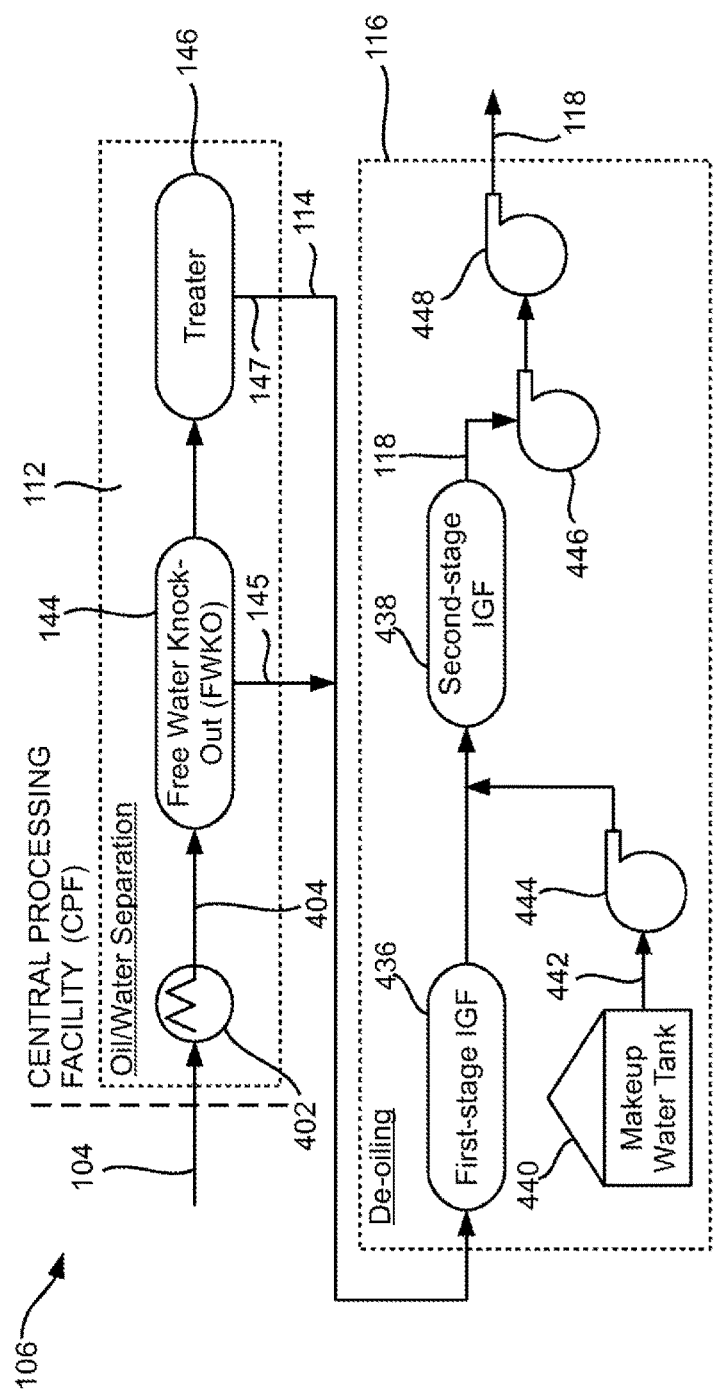

WATER TREATMENT AND STEAM GENERATION SYSTEM FOR ENHANCED OIL RECOVERY AND A METHOD USING SAME

CROSS-REFERENCE TO RELATED APPLICATIONS

This application is a continuation of U.S. patent application Ser. No. 15/447,632, which is a continuation-in-part of U.S. patent application Ser. No. 15/215,714, filed on Jul. 21, 2016, and claiming priority to Canadian patent application Ser. No. 2,956,159, filed on Jan. 25, 2017, the contents of all of which are incorporated herein by reference in their entirety.

FIELD OF THE DISCLOSURE

The present invention relates generally to a water-treatment and steam-generation system, and in particular, to a water-treatment and steam-generation system for enhanced oil recovery and a method for using same.

BACKGROUND

Hydrocarbon resources such as oil, sand, or bituminous sand deposits are found predominantly in the Middle East, Venezuela, and Western Canada. The Canadian bitumen deposits are the largest in the world and are estimated to contain between 1.6 and 2.5 trillion barrels of oil.

Bitumen is heavy, black oil which cannot be readily pumped from the ground due to its high viscosity. As is well known in the art, bituminous sands can be extracted from subterranean reservoirs by lowering the viscosity of the hydrocarbons in-situ thereby mobilizing the hydrocarbons such that they can be recovered from the reservoir. Many thermal-recovery processes such as Steam Assisted Gravity Drainage (SAGD) have been developed to reduce the viscosity by application of heat, chemical solvents, or combinations thereof, and to mobilize the viscosity-reduced hydrocarbons for better recovery. Such recovery processes typically involve the use of one or more "injection" and "production" wells drilled into the reservoir whereby a heated fluid (e.g. steam) can be injected into the reservoir through the injection wells and hydrocarbons can be retrieved from the reservoir through the productions wells.

The fluid produced from the reservoir is usually a mixture of oil and water, i.e., an emulsion. The emulsion is first processed for oil/water separation in a central processing facility (CPF). Bitumen separated from the emulsion is transported to offsite facilities for further processing. Water separated from the emulsion is de-oiled, treated, and recycled within the CPF for steam generation and reinjection. Commercial SAGD plants in Alberta, Canada typically recycle more than 90% of the water from emulsions for use in steam generation.

Traditionally, in order for the water retrieved during the separation/de-oiling processes to be reused, recycled, and/or reinjected, the retrieved water must go through the following two steps:

a) water softening via a standard atmospheric pressure evaporator or water softener (using lime softening and ion exchange), wherein each process option requires energy-intensive cooling of the de-oiled water, and b) steam generation via a drum boiler or alternatively a once-through steam generator (OTSG) wherein the cooled water is heated again to generate steam.

Typically, existing evaporators are forced-circulation mechanical vapor-compression evaporators comprising a vapor drum with vertical or horizontal heating tubes and auxiliary equipment such as a mechanical-vapor compressor, recirculation pumps, tanks, and exchangers.

For example and as will be described in more detail later, two water-treatment and steam-generation technologies are generally known and available for commercial SAGD projects. One process uses lime softening and ion exchange for treating produced water followed by throughput through an OTSG boiler. The other process uses evaporation for treating produced water followed by heating in a drum boiler. Both processes use fired boilers to generate high-pressure steam and both processes require water treatment prior to the steam generation step.

These known processes are costly, time-intensive, energy inefficient, requiring significant operational care, and resulting in significant power consumption and consequently, in high levels of greenhouse gas emissions.

For example, the above-described processes are far from being energy efficient due to temperature variations and/or phase changes along the water path largely due to the contradicting process requirements before and after water softening which include cooling the hot produced water to prevent flashing in the atmospheric tanks or damaging the ion exchanges and later heating softened water up to reserve boiler fuel consumption.

SUMMARY

According to one aspect of this disclosure, there is disclosed a method of generating steam from an emulsion stream produced from a reservoir via thermal recovery. The emulsion stream is a mixture of oil and water. The method comprises: (i) adjusting the emulsion to a first temperature; (ii) obtaining produced water from the emulsion at the first temperature; and (iii) generating steam from the produced water at the first temperature.

In some embodiments, said first temperature is above 100° C.

In some embodiments, said first temperature is between about 100° C. and about 250° C.

In some embodiments, said first temperature is between about 100° C. and about 200° C.

In some embodiments, said first temperature is between about 140° C. and about 150° C.

In some embodiments, obtaining said produced water from the emulsion at the first temperature comprises: (i) separating water from the emulsion at the first temperature; and (ii) removing residual oil from the separated water to obtain the produced water.

In some embodiments, removing said residual oil from the separated water to obtain the produced water comprises removing residual oil from the separated water by using at least two pressurized, high-temperature, induced-gas flotation units (IGF's) coupled in series to obtain the produced water.

In some embodiments, generating said steam from the produced water comprises: generating steam from the produced water at the first temperature by using a high-pressure evaporator operating at a first pressure.

In some embodiments, removing said residual oil from the separated water to obtain the produced water further comprises: (i) using at least one pump to adjust the pressure of the produced water to the first pressure, and (ii) feeding the produced water to the high-pressure evaporator.

According to another aspect of this disclosure, there is provided a system for generating steam from an emulsion stream produced from a reservoir via thermal recovery. The emulsion stream is a mixture of oil and water. The system comprises: (i) a heat exchanger for adjusting the emulsion to a first temperature; (ii) at least one separation device for separating water from the emulsion at the first temperature to obtain produced water; and (iii) a high-pressure evaporator for receiving the produced water and generating steam using the produced water.

In some embodiments, a produced water preheater may be used for preheating the produced water.

According to another aspect of this disclosure, there is provided an evaporator receiving a water stream and generating steam from the water stream. The evaporator comprises: (i) a vapor drum; (ii) a heating element in fluid communication with the vapor drum; and (iii) a heating source for imparting sensible heat to the water stream for generating steam. The evaporator also includes a recirculation pump for forced circulation of blowdown concentrate from the vapor drum to the heating element, and a bubble generator for generating bubbles and injecting the generated bubbles into the heating element.

According to another aspect of this disclosure, there is provided an evaporator for receiving a liquid stream and generating steam from the liquid stream, the liquid stream comprising at least water. The evaporator comprises: (i) a heating element comprising a liquid channel for receiving the liquid stream, and a heating channel for directing a high-temperature heat-exchange medium therethrough to heat the liquid in the liquid stream, (ii) a vapor drum for receiving the heated liquid from the heating element via a top connection pipe and for generating steam from the heated liquid, the vapor drum comprising a steam outlet for discharging generated steam and a blowdown outlet for discharging a blowdown stream comprising un-vaporized liquid and impurities; and (iii) a bubble generator for generating bubbles using a gas-phase substance and injecting generated bubbles into the heating element for self-removal of scales and other deposits in situ in the evaporator.

The removal of scales and other solids is achieved through fluidization and cavitation effects of the injected bubbles in situ in the evaporator, i.e., the removal of scales and other solids occurs inside the evaporator at the location where the solids formed and when the evaporator is in operation.

In some embodiments, a heating source is used to directly heat a heat-exchange medium. The heated heat-exchange medium is circulated into the heating channel of the evaporator for heating the liquid therein.

In some embodiments, the heat-exchange medium for imparting sensible heat to the water stream is a hot oil or a synthetic heat-exchange medium.

In some embodiments, the heating source may be a solar power collector.

In some embodiment, the heating source may be a fired heater.

In some embodiments, the heating source may be a solar power collector and a secondary heater such as a fired heater. The solar power collector and secondary heater may be in either a serial arrangement or a parallel arrangement. The secondary heater may be used for compensating for the solar power for heating up the heat-exchange medium of the high pressure evaporator.

In some embodiments, the liquid channel comprises one or more vertical heating tubes for receiving water injected therein, and the heating channel receives heat-exchange medium heated by the heating source for imparting sensible heat to the water in the one or more heating tubes.

In some embodiments, an optional produced water preheater, e.g., an across exchanger, is provided before the evaporator for pre-heating the produced water feed from the first temperature using the heat-exchange medium. The heat-exchange medium thus leaves the across exchanger with a lowered temperature.

Hereinafter, an optional device or component means that such a device or component may be used in some embodiments but otherwise not be used in some other embodiments, depending on the implementation.

For example, the produced-water preheater is described above as an optional device which means that in some embodiments, the system may comprise a produced-water preheater. However, in some other embodiments, the system may not comprise such a produced-water preheater.

While the produced-water preheater is optional, using such a produced-water preheater can improve energy conservation.

In some embodiments, the bubble generator uses non-condensable gas such as pipeline natural gas for generating bubbles for removing scales and other solids in situ in the evaporator. Non-condensable gas remains in equilibrium with the high-pressure steam thereafter and flows to the reservoir for the non-condensable gas co-injection.

In some embodiments, the bubble generator uses solvent vapor from a solvent vaporizer for generating bubbles for removing of scales and other solids in situ in the evaporator. Solvent remains in equilibrium with the high-pressure steam thereafter and flows to the reservoir for the solvent-assisted extraction.

In some embodiments, the evaporator further comprises: a condenser for receiving a portion of generated steam and condensing received steam to water. The bubble generator receives the condensed water discharged from the condenser and mixes the non-condensable gas or solvent vapor with the received water for generating a water stream with gas bubbles for feeding into the heating element.

In some embodiments, the motive water used for mixing the non-condensable gas, or the solvent vapor for bubble generation is from a water source that is external to the high-pressure evaporator.

In some embodiments, the motive water used for mixing the non-condensable gas, or the solvent vapor for bubble generation is obtained from the evaporator's blowdown stream.

In some embodiments, the bubble generator is a sparger.

In some embodiments, the bubble generator is a bubble pump.

In some embodiments, the bubble generator is an eductor.

In some embodiments, the connection pipe between the vapor drum and heating element comprises a pressure-letdown device such as a throttling valve, an orifice, a converging diffuser, or a converging piping fitting to withhold water in the bubble-mixed feed from flashing until it enters the device, where bubbles therein are squeezed to collapse, creating cavitation for self-removal of scales and other solids in situ in the connection pipe. This technique confines the evaporation-induced scaling to the top connection pipe and simultaneously removes the scale precipitates in the pipe.

In some embodiments, said vapor drum further comprises a steam/liquid interface maintained at a level above its inlet piping system including the pressure-letdown device to allow flashing feed water into bulk liquid to further reduce the entrance turbulence and therefore the nucleation scaling.

The submerged entry also reduces salting as no supersaturation is generated during flashing.

In some embodiments, said steam/liquid interface is maintained for separating impurities from the produced steam thereby forming the blowdown stream.

In some embodiments, the evaporator further comprises a recirculation pump for forced circulation at least a portion of the blowdown stream into the liquid channel of the heating element.

The blowdown recirculation pump may comprise an optional blowdown recirculation cooler in embodiments wherein the constructability of the blowdown recirculation pump is limited and cannot match the operating temperature of the evaporator.

In some embodiments, the evaporator also comprises a crystallizer for further concentrating at least a portion of the blowdown stream and recovering the distillate.

In some embodiments, said crystallizer comprises at least one of a heating element, a flash drum, a sludge recirculation pump, a steam condenser, a condensate sub-cooler, and a transfer pump.

In some embodiments, the crystallizer is used for injecting bubbles into the crystallizer's heating element for removal of scales and other solids through fluidization and cavitation effects in situ in the crystallizer.

In some embodiments, the optional blowdown recirculation cooler may be a part of a plant-wide heat integration cycle using the heat-exchange medium to eliminate the second heat transfer fluid such as glycol and other utility equipment.

In some embodiments, the heat-exchanger medium, after flowing out of with the heating element, flows through the crystallizer and an inlet emulsion cooler in sequence, and flows into the optional blowdown recirculation cooler before being heated by the heating source.

In some embodiments, the hot heat-exchange medium, after flowing out of with the heating element, first gives up heat to the crystallizer and other process heaters arranged in parallel with the crystallizer. Then, the temperature-reduced heat-exchange medium collects heat from the inlet emulsion cooler and other coolers arranged in parallel with the inlet emulsion cooler before being heated by the heating source.

In some embodiments, said other process heaters arranged in parallel with the crystallizer include at least one of the above-described produced water preheater, the above-described solvent vaporizer, and a Rankine cycle power generator.

BRIEF DESCRIPTION OF THE DRAWINGS

FIG. 9 is a schematic diagram of a two-stage water-treatment and steam-generation process for enhanced oil recovery, according to one embodiment of this disclosure;

FIG. 10 shows the devices and detailed process of the phase-separation stage of the process of FIG. 9;

DETAILED DESCRIPTION

Figure 1:
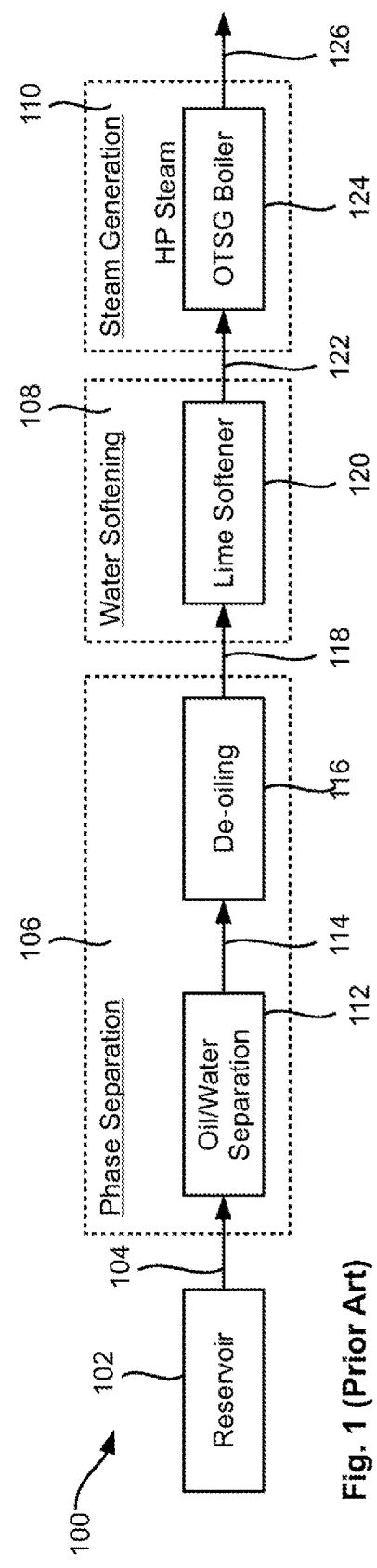
FIG. 1 is a schematic diagram of a prior-art three-stage warm lime softener once-through steam generator (WLS-OTSG) water-treatment and steam-generation process for enhanced oil recovery.

Unless defined otherwise, all technical and scientific terms used herein have the same meaning as commonly understood by one of ordinary skill in the art to which this invention belongs.

As used in the specification and claims, the singular forms "a", "an", and "the" include plural references unless the context clearly dictates otherwise;

The terms "comprising" and "including" as used herein will be understood to mean that the list following is non-exhaustive and may or may not include any other additional suitable items, for example one or more further feature(s), component(s) and/or ingredient(s) as appropriate.

The term "Steam Assisted Gravity Drainage" and its abbreviation "SAGD" as used herein will be understood to mean all thermal in-situ production and processing oil methods including Cyclic Steam Stimulation (CSS) and/or other enhanced thermal exploration, production and processing methods with or without solvent(s), and non-condensable gases co-injection, in the scope of this disclosure.

The term "fouling" as used herein is interchangeable with salting and scaling.

The term "warm lime softener" and its abbreviation "WLS" as used herein, will be understood to mean all the lime softening process, including hot softener which has an abbreviation "HLS".

The term "high pressure" and its abbreviation "HP" as used herein will be understood to mean the pressure of 300 psig (2,069 kPag) and above. The term "low pressure" and its abbreviation "LP" will be understood to mean the pressure between 15 psig (103 kPag) and 100 psig (690 kPag). The term "atmospheric pressure" and its abbreviation "AP" will be understood to mean the pressure between vacuum and 15 psig (103 kPag).

In the following, there is disclosed a system and a method in water treatment and steam generation for SAGD and/or other thermal in-situ oil applications. The system disclosed herein may provide significant economic and environmental benefits.

The system disclosed herein focuses on both cost and energy efficiency to make thermal in-situ oil projects less capital intense, more energy efficient, and more renewable energy friendly. The system is cost-efficient as the disclosed GIC evaporator accepts low-quality feed water from a leaner method for high-pressure steam generation.

The system disclosed herein is energy efficient as it eliminates unnecessary temperature variation and/or phase changes along the water path as characterized in prior arts. The system is a high-temperature pressurized system enabling water treatment and steam generation in one step directly from the de-oiled produced water using a high-pressure fouling-resistant evaporator.

The disclosed system is also renewable energy integratable, capable of using solar energy for high-pressure steam generation. The disclosed system may also integrate Rankine cycle power generation for on-site power generation.

The exponential increase in silica solubility at high temperature is the base for the one-step steam generation process disclosed herein.

As is known in the art, silica is undesirable and must be removed from the boiler feed water. In the existing practices, silica is either removed with a lime softener or in an atmospheric evaporator.

In the prior art where silica is removed in an atmospheric evaporator at about 100° C., a large amount of caustic must be added to increase the pH of the solution to an excessive high value, e.g. greater than 13, for suppressing silica precipitation. However, such practice promotes calcite scaling.

The process disclosed herein maintains a high temperature of nearly 300° C. in the evaporator. The increased solubility as the result of high temperature can keep the silica in solution at a lower pH to simultaneously sequester scaling.

Steam generation takes place in a scaling-resistant evaporator system as described below, in one step with no feed water softening and with a reduced caustic consumption.

While the disclosed water treatment and steam generation system streamlines temperature and pressure from oil/water separation and de-oiling to steam generation for higher energy efficiency, it also eliminates the need of any produced-water cooler between the treater and the skim tank in prior art along with the issues associated with this equipment piece which is notorious for its severe fouling.

The system and method disclosed herein replace the traditional water-softening and steam-generation steps with a single step of steam generation using a high-pressure evaporator.

In some embodiments, the high-pressure evaporator disclosed herein is a fouling-resistant evaporator, functions at high pressure and temperature, and generates steam directly from the de-oiled produced water in one step with no feed water softening.

The disclosed evaporator is based on a forced circulation, rising film long tube vertical (FCRFLTV) evaporator commonly used in chemical industry. The disclosed evaporator adds fouling-resistant characteristic to FCRFLTV evaporators by introducing micro-bubbles for self-removal of scales and other solids in situ in the evaporator.

The disclosed high-pressure evaporator is suitable for steam generation in the central processing facility (CPF) of a SAGD plant, or alternatively for satellite steam generation at a well pad.

For purposes of illustration and comparison, two prior-art water treatment processes are first described.

FIG. 1 is a schematic diagram of a prior-art, three-stage water treatment and steam generation process 100 for enhanced oil recovery such as SAGD. The process 100 uses warm lime softener (WLS) to treat water in the emulsion 104 produced from a reservoir 102 through one or more thermal wells, and a once-through steam generator (OTSG) to generate high pressure injection steam. This process is denoted as a WLS-OTSG process.

In this embodiment, the emulsion 104 is a high-temperature (typically between about 170° C. to about 180° C.) oil-and-water mixture produced from the reservoir 102 by thermal production, and usually contains some gas, solids, and hardness/silica that may cause fouling in water treatment devices. The process 100 separates water from the emulsion 104, removes impurities (e.g., residual oil, gas, solids, hardness and silica), and generates high-pressure steam.

As shown in a first phase-separation stage 106, the emulsion 104 produced from the reservoir 102 is processed by oil/water separation 112 for separating gas, oil, and water. The gas and oil separated therefrom are further processed using technologies known to those skilled in this art.

Water 114 separated from the emulsion 104 usually still contains a small amount of residual oil and is further processed by de-oiling 116 to remove residual oil therein, thereby obtaining de-oiled water 118 (also denoted as produced water).

At a second water-softening stage 108, the produced water 118 is fed into a water-softening process containing a lime softener 120 and weak acid cations (WACs) or strong acid cations (SACs) 186 (see FIG. 3) for removing silica and hardness therein and outputting softened water 122.

At a third, steam-generation stage 110, the softened water 122 is fed into an OTSG boiler 124 for generating high-pressure (HP) steam 126, which may be injected into the reservoir 102 for oil production.

Figure 2:
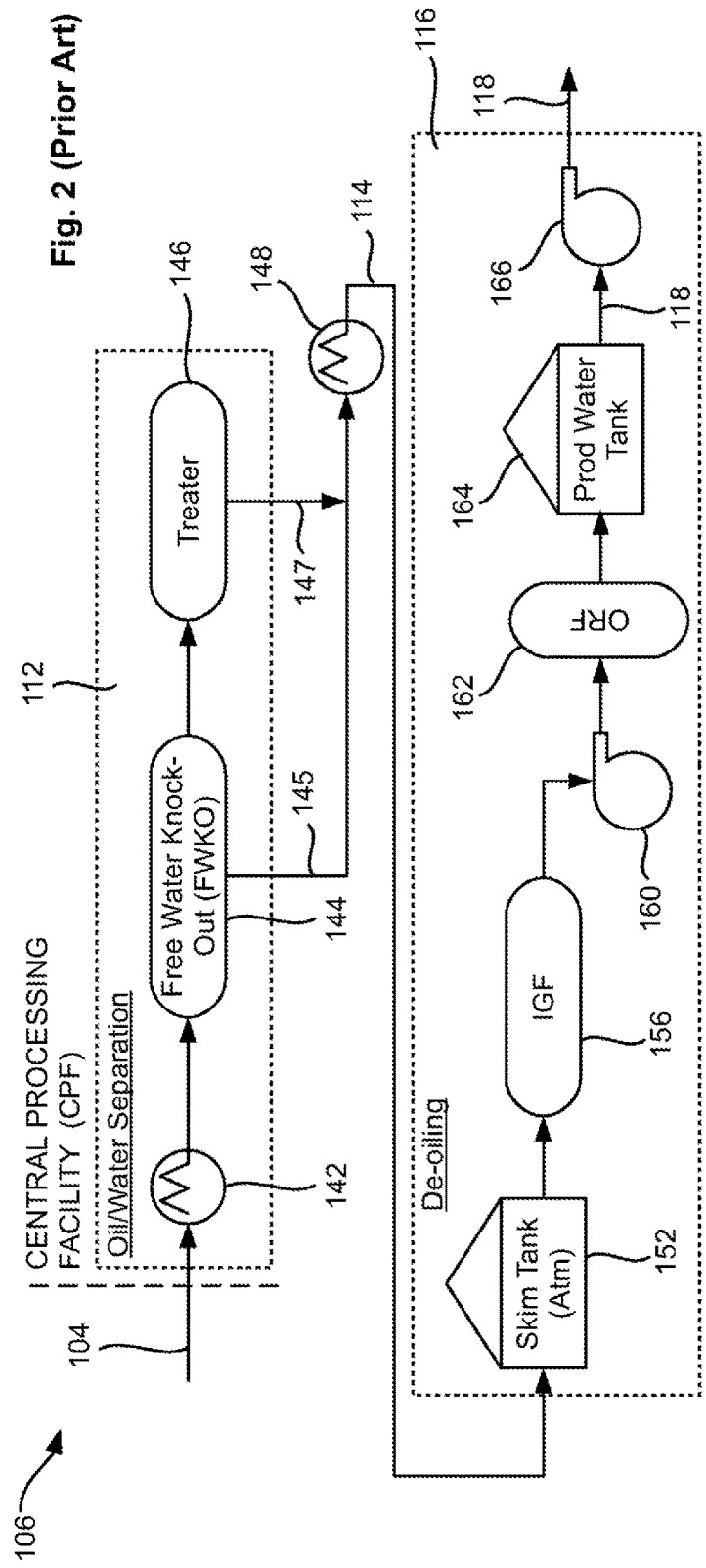
FIG. 2 shows the devices and detailed process of the phase-separation stage of the WLS-OTSG process of FIG. 1.

FIG. 2 shows the devices and detailed process of the phase-separation stage 106 of the WLS-OTSG process 100, which are usually located in a CPF. As the emulsion 104 is a high-temperature oil-and-water mixture, it is first cooled down by an inlet cooler 142 (via, e.g., heat exchanging) to about 140° C. to 150° C., combined with diluent, and then fed into a three-phase separator 144 such as a free water knock-out (FWKO) unit which separates the majority of water from the emulsion 104 using gravity. The oil separated by the FWKO 144, still containing some water, is fed into a treater 146 for desalting and dewatering, thereby generating an oil product (not shown) with impurity of less than 0.5% basic sediment and water (BS&W).

The water 145 and 147 discharged from the FWKO 144 and the treater 146, respectively, are at a temperature of about 140° C. to 150° C. The water 145 and 147 are combined and are further cooled by a produced-water cooler 148 to about 80° C. to 90° C. The cooled water 114 is then processed for de-oiling 116.

In this example, the cooled water 114 passes through a skim tank 152, an induced gas flotation (IGF) unit 156, and an oil removal filter (ORF) 162 for removing oil and fine solids therein. Pumps, e.g., a transfer pump 160, may be used for transferring water between de-oiling units 152, 156, and 162. Each of the de-oiling units 152, 156, and 162 can remove about 90% oil from its inlet water. The produced water 118 discharged from the ORF 162 is stored in a produced water tank 164 and may be pumped by a transfer pump 166 from the produced water tank 164 to unit(s) in the water-softening stage 108 for further processing.

Figure 3:
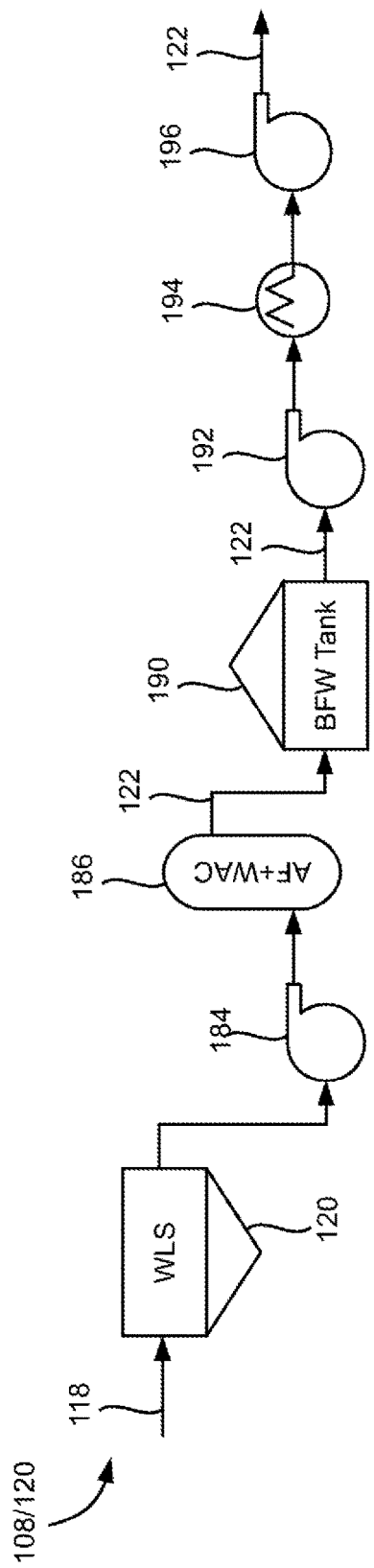
FIG. 3 shows the devices and detailed process of the water-softening stage of the WLS-OTSG process of FIG. 1.

FIG. 3 shows the devices and detailed process of the water-softening stage 108 of the WLS-OTSG process 100. As shown, the produced water 118 discharged from the produced water tank 164 (FIG. 2) is processed using a warm lime softener (WLS) 120 and then in a weak acid cation (WAC) ion exchange unit 186 for removing silica and hardness, respectively. After-filter (AF) may also be used for lowering the water turbidity. Pump 184 may be used for transferring water from WLS 120 to WAC ion exchange unit 186. The treated or softened water 122 (also denoted as boiler feed water) discharged from the WAC ion exchange unit 186 is stored in a boiler feed water (BFW) tank 190, and may be re-heated by one or more cross-exchangers or heat exchangers 194 to a higher temperature before entering the steam generation stage 110 for steam generation. A low-pressure (LP) pump 192 is used to pump the boiler-feed water 122 through the heat exchangers 194 which heats the boiler-feed water 122 using low-grade heat and then feeds the heated water 122 into the devices of the steam-generation stage 110 via a high-pressure (HP) pump 196.

Figure 4:
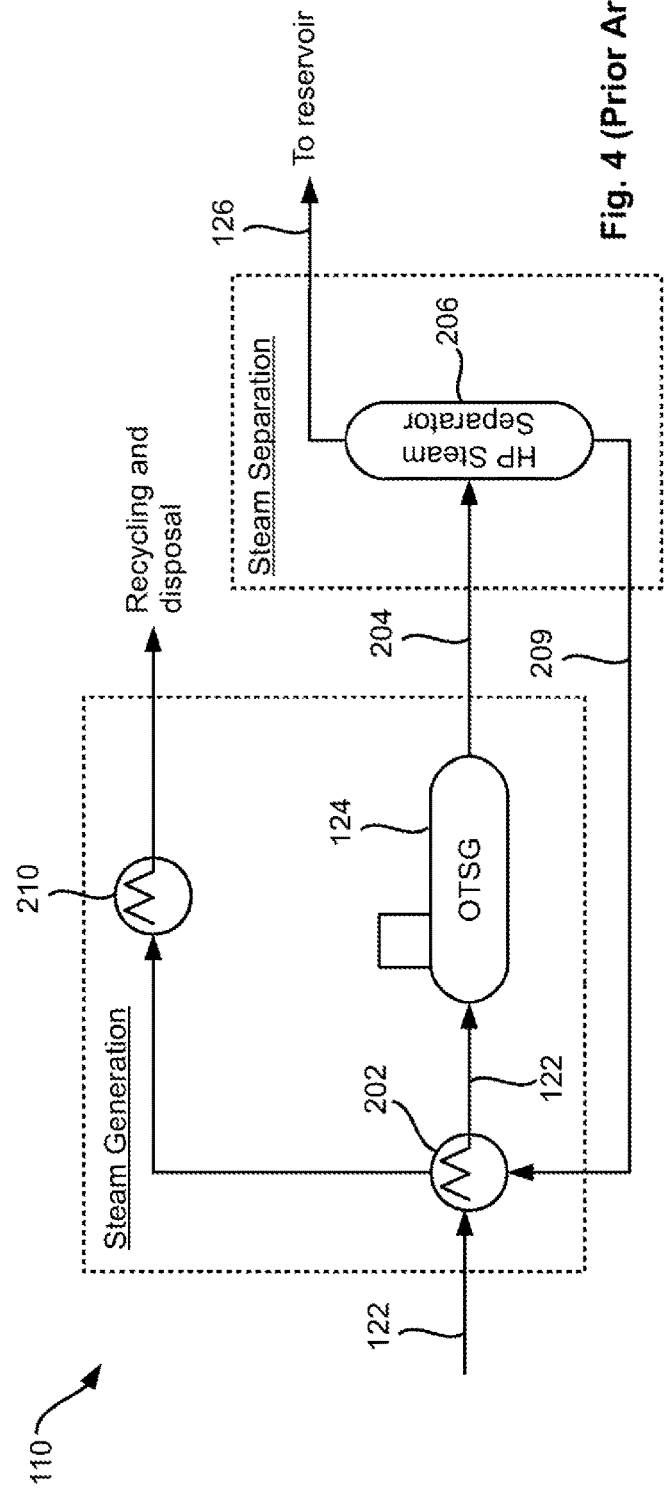
FIG. 4 shows the devices and detailed process of the steam-generation stage of the WLS-OTSG process of FIG. 1.

FIG. 4 shows the devices and detailed process of the steam-generation stage 110 of the WLS-OTSG process 100. In this example, progressive heating is used, and as shown, the boiler-feed water 122 is first pre-heated by a heat exchanger 202 using high-grade heat to about 180° C. to 190° C. The heated water 122 is then fed into an OTSG 124 to generate wet steam 204. The OTSG 124 can produce about 80% wet steam and about 20% blowdown (comprising un-vaporized liquid and impurities such as solids) based on treatment of a typical produced water with previously-described lime softener process 108 and must be followed by equipment to further separate blowdown for dry steam. In the example shown in FIG. 4, the wet steam 204 is fed into a high-pressure steam separator 206 which generates high-temperature high-pressure (HP) steam 126 for injection into reservoir 102 or oil wells. Steam blowdown 209 (typically at about 300° C. and usually containing some impurities) from the HP steam separator 206 is fed back to the heat exchanger 202, thereby transferring heat to the boiler feed water 122. After heat exchange, the temperature-reduced steam blowdown 209 is fed to a blowdown cooler 210 to be cooled down for recycling and disposal.

While FIG. 4 shows a single-stage high-pressure steam separator 206, multi-stage steam separation may be required when an improved water recycle rate is needed and/or when a low pressure steam is needed for a hot lime softener.

The above prior-art system 100 has several drawbacks. For example, oil contamination to the WLS 120 and the WAC ion exchange unit 186 can be costly because of the mass cleaning required thereof, loss of production, and/or equipment damage. Therefore, de-oiling 116 in the phase-separation stage 106 is designed as a three-step process involving three units, i.e., a skim tank 152, an IGF 156, and an ORF 162, to provide necessary redundancy for safeguarding the WLS 120 and the WAC ion-exchange unit 186 from oil contamination. Such multi-step de-oiling 116 causes high cost in equipment and operation.

Another drawback in the phase-separation stage 106 is the low energy efficiency, as the produced water must be cooled down in the produced-water cooler 148 from about 140° C. to 150° C. to about 80° C. to 90° C. and then later heated to about 180° C. to 190° C. after water softening 108, thereby wasting energy in this cooling-down/heating-up cycle.

Further, the produced-water cooler 148 is required in the above prior-art system 100 to prevent hot water 140 and 142 discharge from FWKO 144 and the treater 146, respectively, from flashing into the skim tank 152 (FIG. 2) or to prevent melting the WAC ion exchange 186 (FIG. 3). However, the produced-water cooler 148 in the system 100 has strong tendency of fouling and a good fouling prevention solution is yet to be found.

The above-described water softening process 108 had been dominant in Alberta, Canada, until a directive became effective to optimize water recycle efficiency and make up water sources. Depending on the produced water chemistry, this process may not be able to meet the required recycle unless a backend evaporator, another OTSG, or equivalent is also utilized.

The above-described water softening process 108 also requires a large number of equipment resulting in high capital cost and requires large environmental footprint. The water softening process 108 causes substantial energy and greenhouse gas emission due to frequent water transfers including recycle, backwash, regeneration, and rinse. The process 108 requires a substantial amount of chemicals and skilled operators with a high level of operational attention.

As described above, in the event of oil channeling in the de-oiling 116, the produced water 118 fed into the water softening process 108 can contain substantial amount of oil, causing contaminations in WLS 120, WAC ion exchange unit 186, and the OTSG 124.

Figure 5:
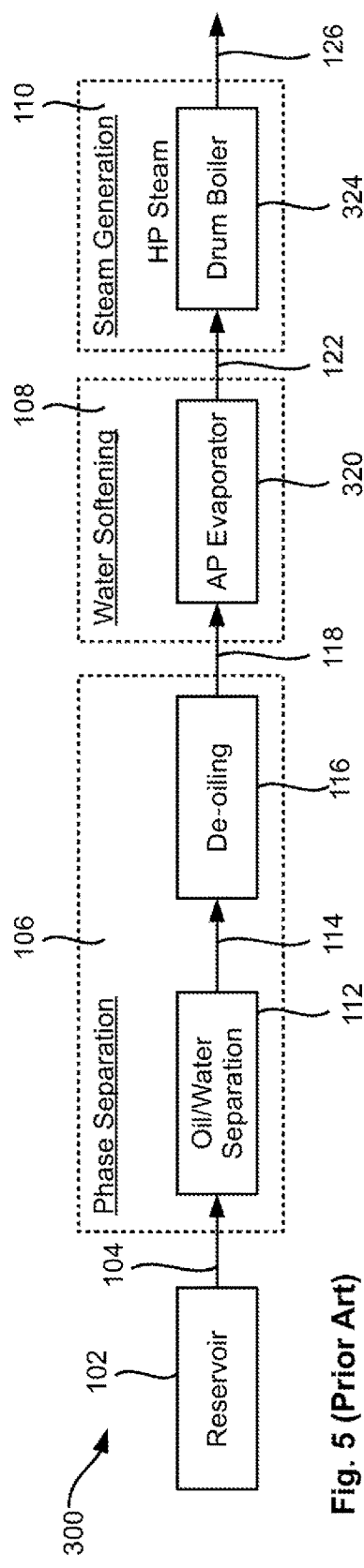
FIG. 5 is a schematic diagram of another prior-art three-stage evaporator-drum boiler water-treatment and steam-generation process for enhanced oil recovery.

FIG. 5 is a schematic diagram of another prior-art three-stage water-treatment and steam-generation process 300 for enhanced oil recovery. The process 300 uses evaporator and drum boiler, and is denoted as an evaporator-drum boiler process. The evaporator-drum boiler process 300 recently becomes more popular due to the tightened regulation in water management.

The process 300 is similar to the process 100 of FIG. 1 except that the process 300 uses an atmospheric pressure (AP), front-end evaporator 320 for water softening 108 and a drum boiler 324 for steam generation 110. Accordingly, some devices used in the process 300 are different from those of the process 100.

Figure 6:
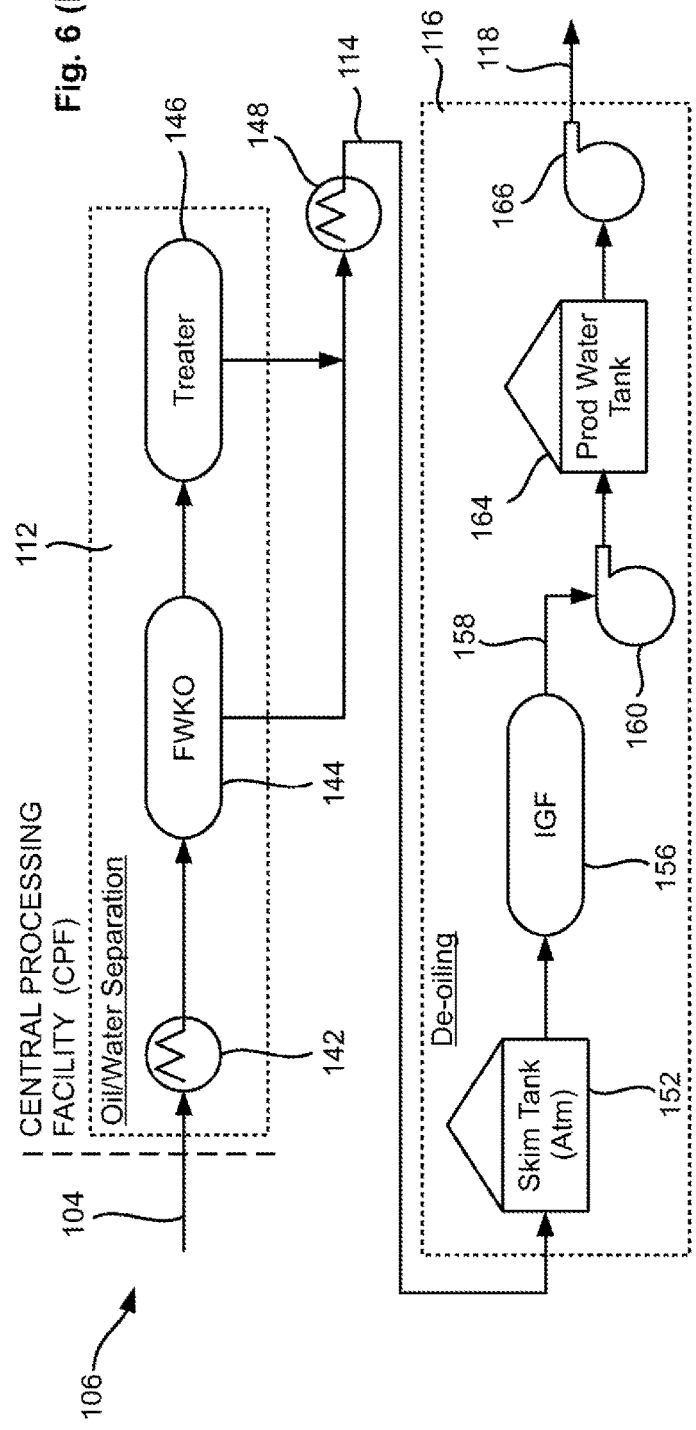
FIG. 6 shows the devices and detailed process of the phase-separation stage of the evaporator-drum boiler process of FIG. 5.

FIG. 6 shows the devices and detailed process of the phase-separation stage 106 of the process 300 which are usually located in a CPF. As seen, the phase-separation 106 of the process 300 is similar to that of the process 100 except that in the process 300, de-oiling 116 is a two-step process using a skim tank 152 and an IGF 156. No ORF is required.

The omission of ORF is benefited from the use of the AP front-end evaporator 320 in the water softening stage 108 which is less sensitive to oil contamination in the produced water 118 and thus does not require high-level de-oiling.

Figure 7:
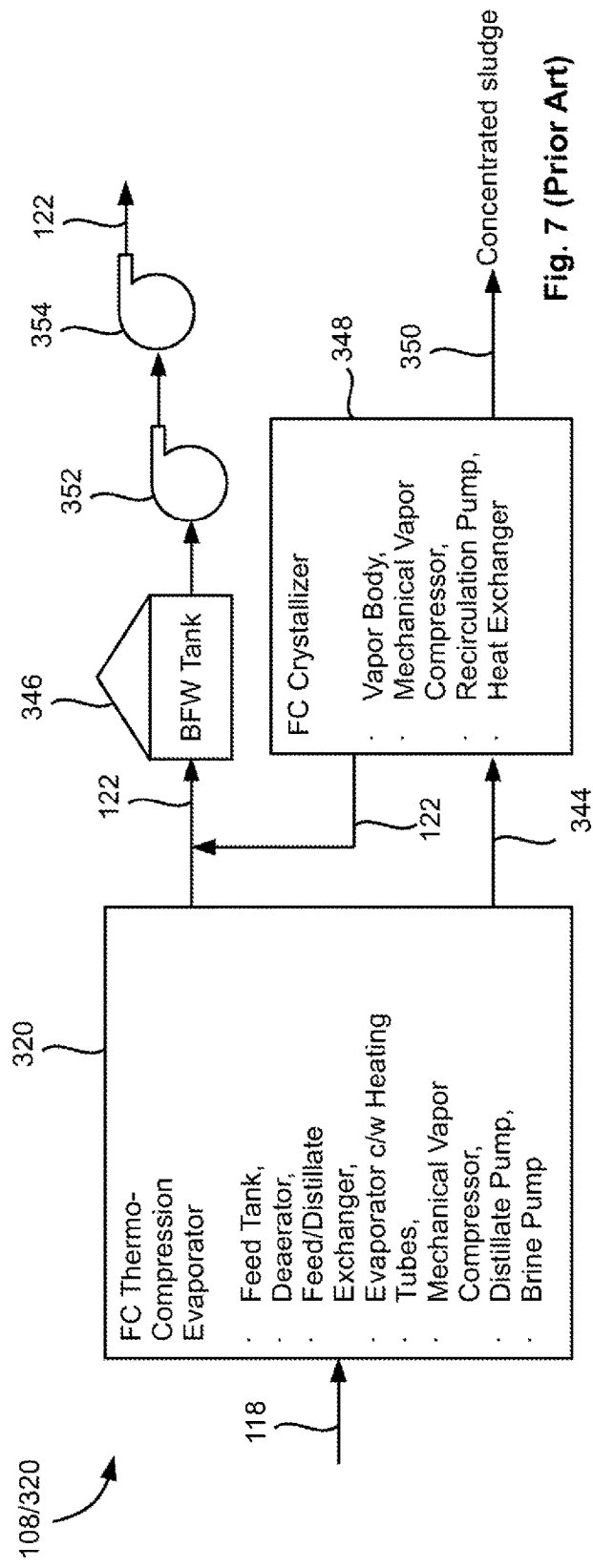
FIG. 7 shows the devices and detailed process of the water-softening stage of the evaporator-drum boiler process of FIG. 5.

FIG. 7 shows the devices and detailed process of the water-softening stage 108 of the process 300. As shown, the produced water 118 is fed into a forced circulation (FC) thermo-compression front-end evaporator 320.

Many front-end evaporators are forced circulation, mechanical vapor compression evaporator packages comprising a vapor drum with vertical or horizontal heating tubes, and requisite components such as a feed tank, a deaerator, a feed/distillate exchanger, a mechanical vapor compressor, recirculation pumps, a distillate pump, a brine pump, and the like.

To ensure proper working of the evaporator 320, it is necessary to condition and remove $O_2$, $CO_2$ and $SO_2$ from the produced water 118 to protect the evaporator from corrosion or fouling. In many cases, the evaporator package is supplied with its own conditioning tank and deaerator. In other cases, the produced water tank 164 upstream of the evaporator 320 is used as the conditioning tank.

Front-end evaporators 320 are often used when no disposal well is available or when a producer cannot obtain the required produced-water recycle efficiency (which may be otherwise produced using the process of FIG. 1). Comparing to the WLS-OTSG process 100, a large front-end evaporator 320 followed by a drum boiler 324 costs less than adding a backend evaporator to the process 100.

The evaporator 320 uses distillation to separate water from impurities. The distilled water 122, i.e., softened water, is discharged from the evaporator 320 into a boiler-feed water (BFW) tank 346 for storage. The sludge 344 which comprises impurities and some water, is transferred into a FC crystallizer 348 which may comprise necessary components such as a vapor body, a mechanical vapor compressor, a recirculation pump, a heat exchanger, and the like. The FC crystallizer 348 further separates water from impurities, discharges separated water 326 to the BFW tank 346 for storage, and discharges concentrated sludge 350 for disposal.

The softened water 328 in the BFW tank 346 may be pumped via a low-pressure (LP) BFW pump 352 and a HP BFW pump 354 to the drum boiler 324 (see FIG. 5) for steam generation.

Figure 8:
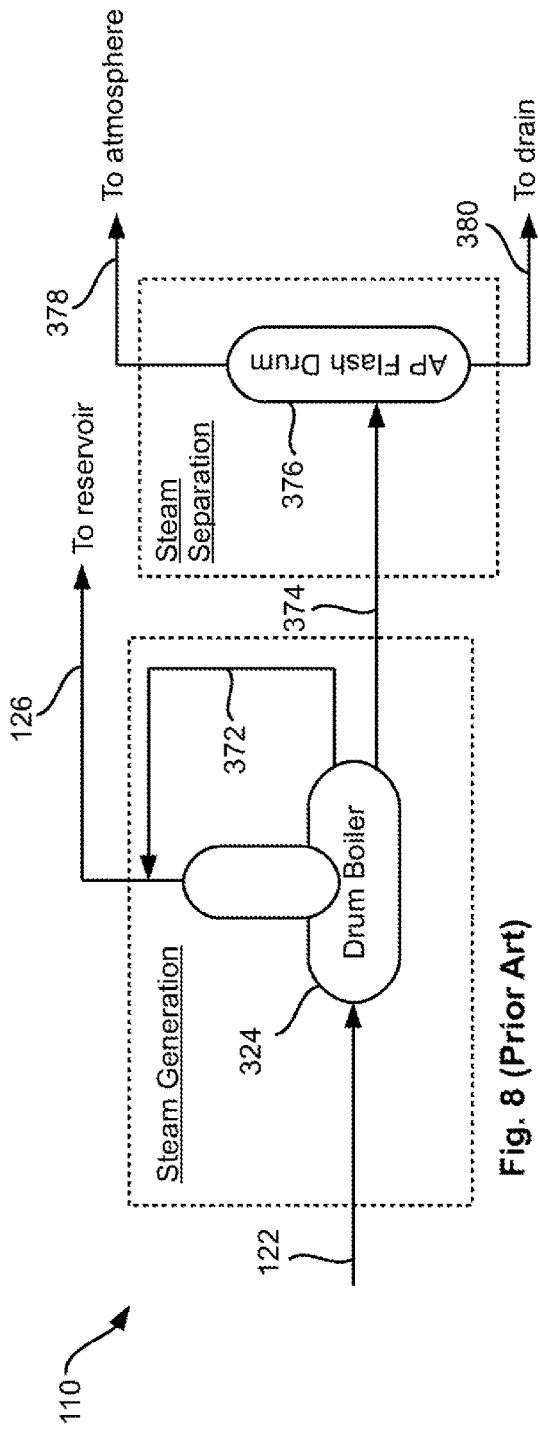
FIG. 8 shows the devices and detailed process of the steam-generation stage of the evaporator-drum boiler process of FIG. 5.

FIG. 8 shows the devices and detailed process of the steam generation stage 110 of the process 300. As shown, the boiler feed water 122 is fed into a drum boiler 324 to generate HP steam 126 for injection into reservoir 102 or oil wells. As is known in the art, drum boiler 324 is a "water tube" boiler with water on the tube side for high-pressure steam generation, typically in the range of 7,000-9,000 kPag. The drum boiler 324 has tendency of fouling and requires high-purity boiler feed water 122 that may be obtained by evaporation and which may not be obtainable via chemical treating of produced water.

Injection wells can tolerate small amounts of liquid in the injection steam without compromising the measurement, accounting, reporting, and other regulatory requirements. This allows the continuous blowdown 372 to be re-combined with the dry HP steam for a wet-injection stream while the intermittent blowdown 374 is flashed into an AP flash drum 376 to further reduce its volume. The flashed vapor 378 is discharged in to the atmosphere in the form of vapor and water 380 is discharged into the plant open-drain system. There are negligible impurities in water 380 because of the high-quality distillate nature of boiler feed water 122.

In some situations, the process 300 may comprise two evaporators 320 coupled in series, which are followed by a single crystallizer 348.

The process 300 also has several drawbacks. For example, while the drum boiler 324 has higher working pressure and larger capacity, and is more efficient comparing to the OTSG, its initial cost is high.

The initial cost of the front-end evaporator 320 is also quite high because of the required large surface areas and the number of auxiliary equipment. While the energy efficiency of the front-end evaporator 320 is high due to the latent heat reuse and good heat transfer, the overall energy efficiency of the system 300, however, is lowered because of cyclic phase changes. The distillates condensed from the steam vapor in the evaporator 320 need to be re-evaporated in the drum boiler 324. Compared to the process 100 using WLS 120 and WAC ion exchange unit 186, the total cost of the evaporator-drum boiler process 300 may be merely marginally lower, but the greenhouse gas emissions of the process 300 are much higher.

FIG. 9 is a schematic diagram of a two-stage water treatment and steam generation process 400 for enhanced oil recovery such as SAGD, according to one embodiment of this disclosure. The process 400 disclosed herein is simple and energy efficient. Compared to the prior-art processes 100 and 300, the process 400 does not comprise any water-softening stage.

As shown, the emulsion 104 produced from the reservoir 102 is first processed at a phase-separation stage 106 to obtain produced water 118 from the emulsion 104. The produced water 118 is then directly fed into an HP evaporator 424 in the steam generation stage 110 for steam generation. In other words, the process 400 uses the HP evaporator 424 and a pressurized system to generate HP steam 126 directly from the produced water 118. The water-softening stage is thus eliminated and a simplified de-oiling process 116 is used to supply high-temperature, high-pressure water to the evaporator 424.

FIG. 10 shows the devices and detailed process of the phase-separation stage 106 of the process 400, which are usually located in a CPF.

As shown, an inlet heat exchanger 402 is used to first adjust the emulsion 104 to a process temperature sufficiently high to maintain silica dissolved therein, to achieve the best separation efficiency in the downstream FWKO 144 and treater 146.

In various embodiments, the process temperature is set based on various factors such as the viscosity and specific gravity profiles of the emulsion 104, the treating method (e.g., dilute treating or flash treating process), and the like. In some embodiments, the inlet heat exchanger 402 adjusts the emulsion 104 to a process temperature above 100° C. In some other embodiments, the inlet heat exchanger 402 adjusts the emulsion 104 to a process temperature between about 100° C. and about 250° C. In yet some other embodiments, the inlet heat exchanger 402 adjusts the emulsion 104 to a process temperature between about 100° C. and about 200° C. In still some other embodiments, the inlet heat exchanger 402 adjusts the emulsion 104 to a process temperature between about 140° C. and about 150° C.

In this embodiment, the emulsion 104 produced from the reservoir 102 is a hot oil/water stream, and the inlet heat exchanger 402 cools the emulsion 104 down to a process temperature between about 140° C. and about 150° C., which is suitable for operation of traditional downstream devices such as FWKO 144 and treater 146, and is still sufficiently high to maintain silica in a dissolved state in the emulsion 104.

The temperature-adjusted emulsion identified using numeral 404, is discharged from the inlet heat exchanger 402 and fed into a three-phase separator 144 such as a FWKO unit which separates the majority of water from the oil and water mixture 104 using gravity. The oil 406 separated by the FWKO 144, still containing some water, is fed into a treater 146 for desalting and dewatering.

The separated water 145 and 146 discharged from the FWKO 144 and the treater 146, respectively, are combined (identified using numeral 114) and processed by de-oiling 116 for removing residual oil from the separated water 114.

The de-oiling 116 of the process 400 is simplified by using a first-stage and a second-stage pressurized IGFs 436 and 438 coupled in series for removing oil and fine solids therefrom. In this embodiment, both IGFs 436 and 438 are operated at about the same temperature as the FWKO 144 and the treater 146, e.g., between about 140° C. and about 150° C., thereby eliminating the produced-water cooler 148 used in the process 100 of FIG. 1.

Optionally, make-up water 442 may be supplemented into the second-stage IGF 438 from a make-up water tank 440 via a transfer pump 444, for the purposes of supplying startup water, make-up water, and decoupling production from steam injection.

The produced water 118 discharged from the second-stage IGF 438 typically has a pressure between 300 kPag and 500 kPag. The produced water 118 is further pressurized to a higher pressure, e.g., between about 6,000 kPag to 10,000 kPag, and is pumped to the HP evaporator 424 in the steam generation stage 110 via an HP evaporator booster pump 446 and an HP evaporator charge pump 448. In this embodiment, the HP evaporator charge pump 448 has a high net-positive suction head (NPSH) requirement, and requires a booster pump 446 to avoid cavitation.

In the de-oiling 116 of the process 400, both IGFs 436 and 438 can remove free or entrained oil to a level that does not cause severe foaming in the HP Evaporator 424. In contrast to the prior-art process 100 or 300 (FIG. 1 or 5) wherein the feed water quality must meet the OTSG manufacturers' or the American Society of Mechanical Engineers' (ASME) guidelines for OTSG's/water tube boilers, the feed water to the evaporator merely needs to be sufficient for safe operation of the evaporator and the injection wells. Consequently, as will be described in more detail below, the process 400 does not comprise any WLS, nor WAC ion-exchange unit for silica and harness removals.

In addition to its primary function of de-oiling, the second-stage IGF 438 may also serve as a mixing drum for removing the entrained non-condensable impurities originating from the make-up water 442. If needed, pre-conditioning chemicals (not shown) can be added to the inlet of the HP evaporator booster pump 446 or the inlet of the HP evaporator charge pump 448. Such chemicals may include, but are not limited to, anti-foam agents, scale inhibitors, dispersants, and caustic soda solutions.

Although not shown in FIG. 10, in an alternative embodiment for a flash treating scenario, a heat exchanger (not shown) may be used to heat the high-pressure emulsion exiting the FWKO 144 in order to achieve a flashed oil specification of 0.5% BS&W in a high-temperature inverted-flash separator.

Figure 11:
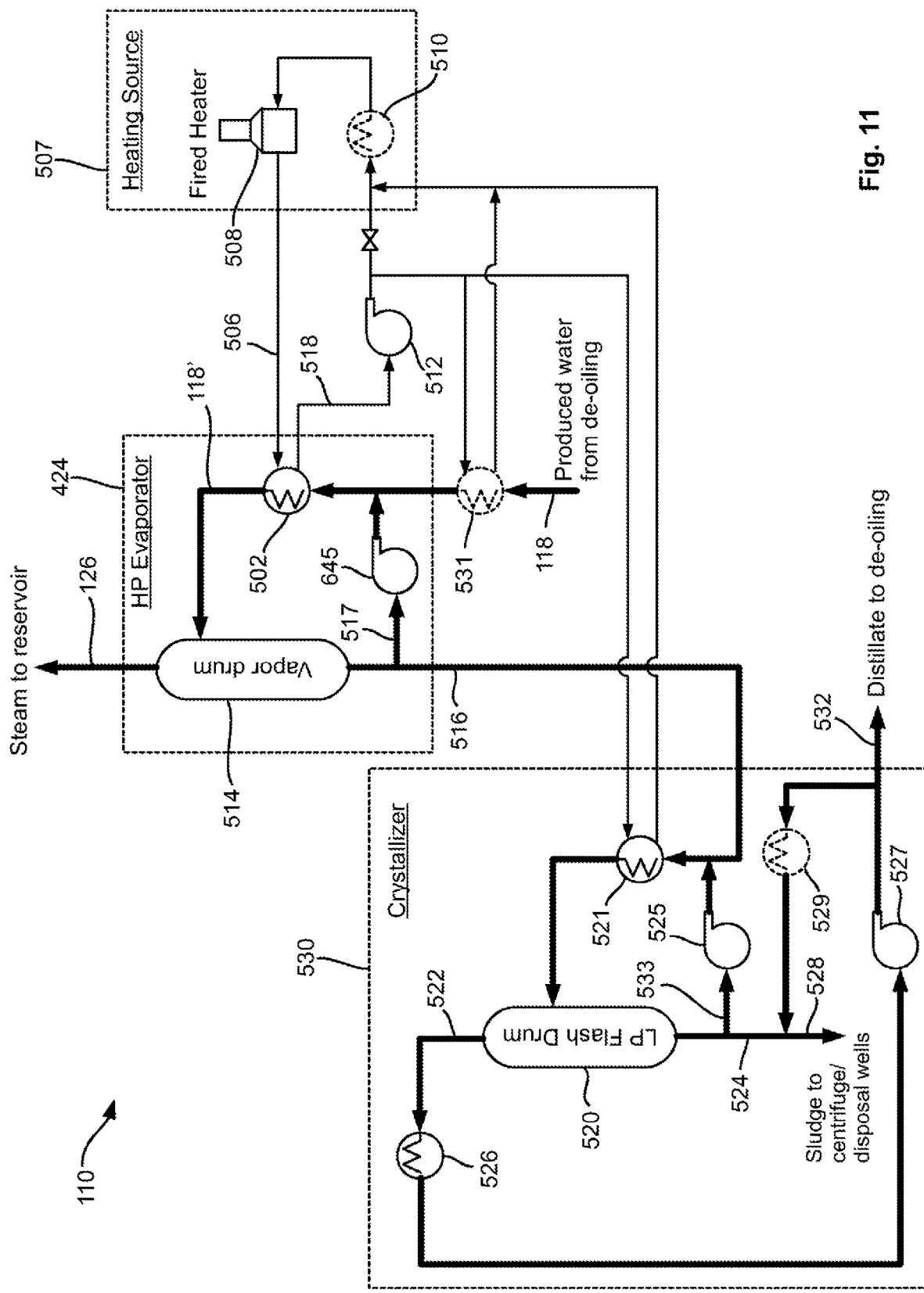
FIG. 11 shows the devices and detailed process of the steam-generation stage of the process of FIG. 9.

FIG. 11 shows the devices and detailed process of the steam-generation stage 110 of the process 400. The components shown in broken lines in FIG. 11 are optional components, that is, they may be used in some embodiments, and may be omitted and not used in some other embodiments.

As will be described in detail, the devices and process of the steam generation stage 110 produce high-pressure steam 126 directly from the produced water 118. The associated blowdown-handling system, e.g. the crystallizer 530, is also described herein, as they are inherently related.

The details about the fouling-resistant features of the evaporator (and the crystallizer) will be described later in related to the GIC evaporator, and thus are omitted from FIG. 11 and its related description.

As shown in FIG. 11, the produced water 118 is fed into the heating element 502 of the HP evaporator 424, and is heated by hot heat-exchange medium 506. The heated produced water 118' is then flashed into a vapor drum 514 in which the high-pressure steam 126 is separated from the blowdown and is sent to reservoir 102 for injection.

The steam 126 from the HP evaporator 424 may still contain a small amount of impurities that are saturated in the steam through equilibrium. However, such small amounts of impurities would not cause operational problems in the pipeline, nor would these cause the reservoir 102 to foul.

The blowdown containing un-vaporized water, falls to a lower portion of the flash drum 514 and splits, e.g., by using a pipe tee, into a circulation stream 517 and a blowdown discharge stream 516. The concentrated blowdown stream 516 is discharged from the vapor drum 514 into the crystallizer 530 (described later). On the other hand, the blowdown circulation stream 517 is forced, e.g., pumped by a blowdown recirculation pump 645, to circulate through the heating element 502 and reenters the vapor drum 514.

In particular, before entering the heating element 502, the forced blowdown circulation 517 from the recirculation pump 645 is combined with the produced water 118, and the mixture is then fed into the evaporator's heating element 502, in which the mixture is heated before flashing into the vapor drum 502.

Although not shown in FIG. 11, those skilled in the art will appreciate that a boiling-suppression device may be installed on the piping between the heating element 502 and the vapor drum 514 to avoid boiling occurring within the heating element 502.

As described above, the mixture of the forced blowdown circulation 517 and the produced water 118 is fed into the heating element 502 and is heated therein by a hot heat-exchange medium 506, which may be a suitable hot oil.

In this embodiment, the heat-exchange medium 506 is heated by a heating source 507 to a high temperature, e.g., between about 240° C. and about 400° C. The heating source 507 in this embodiment comprises a solar collector 510, and may also comprise a secondary heating source such as a fired heater 508 for compensating for intermittent solar power. In particular, the fired heater 508 is automatically shut down when solar power is sufficient for maintaining the heat-exchange medium 506 at a designated temperature between about 240° C. and about 400° C. (e.g., during daytime), and is automatically started when solar power is insufficient (e.g., during nighttime and during daytime in overcast days). When the fired heater is turned on, heating power thereof is automatically adjusted to compensate for the solar power for maintaining the heating-exchange medium to the designated temperature.

As shown in FIG. 11, the solar collector 510 is optional. Thus, in some embodiments, no solar collector 510 is used, and the heating source 507 may only comprise a fired heater 508.

After heating the produced water 118, the temperature-reduced heat-exchange medium 518 flows out of the heating element 502 and is pumped via a heat-exchange medium pump 512, back to the heat source 507 for re-heating.

In this embodiment, at least a portion of heat-exchange medium 518 is diverted to the crystallizer heating element 521 and an optional produced-water preheater 531, and then used therein as a heating source.

During steam generation, the solids and other impurities in the produced water 118 are concentrated in the high-pressure evaporator 424, and then in the crystallizer 530, which is essentially a second-stage evaporator.

The crystallizer 530 is equivalent to the crystallizer used in the water-softening stage of the prior-art evaporator-drum boiler process 300 (see FIG. 7), or the prior-art backend evaporator supplemental to the lime softener-OTSG process (see FIG. 4).

Referring back to FIG. 11, a blowdown stream 516 from the evaporators vapor drum 514, e.g., about 5% to about 40% of feed, is discharged to the crystallizer 530 for further concentrating the blowdown and recovering the distillate. The crystallizer 530 is in direct fluid communication with the evaporator 424 through the vapor drum 514 of the evaporator 424 and the heating element 521 of the crystallizer 530. There is little pressure difference between the two vessels (i.e., the vapor drum 514 and the heating element 521).

In the crystallizer flash drum 520, low-pressure steam 522 is separated from the sludge and condensed in a condenser 526. The sludge falls to the lower portion of the crystallizer flash drum 520 and splits into a circulation sludge stream 533 and a concentrated sludge stream 524.

The circulation sludge stream 533 is pumped by a sludge circulation pump 525 and is combined with the blowdown discharge 516 to circulate through the heating element 521, in which the mixture is heated, and flash into the crystallizer flash drum 520. The concentrated sludge stream 524 is discharged from the crystallizer flash drum 520 as waste to, e.g., a centrifuge or disposal wells.

Although not shown in FIG. 11, those skilled in the art will understand that a boiling suppression device may be installed on the piping between the heating element 521 and the crystallizer flash drum 520.

The flashed steam vapor 522 is condensed in a steam condenser 526, and the condensed steam is recycled back to the de-oiling system by a condensate transfer pump 527 for reuse as feed water to the high-pressure evaporator.

In some embodiments, a portion of the condensed steam from the transfer pump 527 may be further cooled in a condensate subcooler 529, and recombined with the concentrated sludge stream 524 in an effort to form a colder sludge stream 528, e.g., at about 80° C. to about 90° C., acceptable to the centrifuges (not shown), or the disposal wells.

In this embodiment, chemicals such as anti-foam agents, scale inhibitors, dispersants, and caustic soda solutions may be added into the de-oiling system 116, the high-pressure evaporator 424 and the crystallizer 530. However, most of the chemicals will be in the internal circulation within the evaporator 424 and the crystallizer 530, and therefore, the actual chemical consumption is lower compared to the prior-art systems.

Following is a description of a prior-art forced circulation rising-film long-tube vertical (FCRFLTV) evaporator for the purpose of illustration, which is followed by a description of a fouling-resistant HP evaporator according to one embodiment of this disclosure is described, and then followed by a comparison of this embodiment with the prior-art FCRFLTV evaporator.

Figure 12:
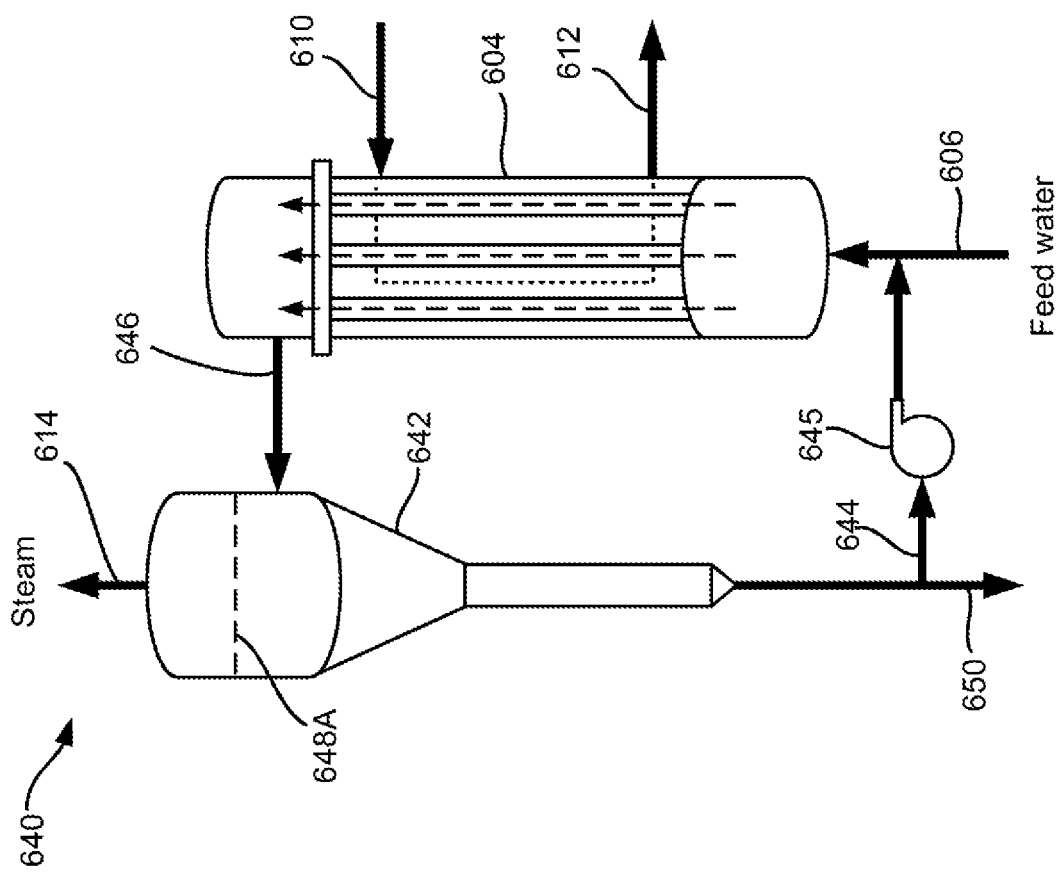
FIG. 12 is a schematic diagram of a prior-art forced-circulation rising-film long tube vertical evaporator (FCR-FLTV)

FIG. 12 is a schematic diagram of a prior-art FCRFLTV evaporator 640, commonly used in, e.g., the chemical industry as a concentrator to produce anhydrous chemical product. The FCRFLTV evaporator is not well-suited for processing SAGD produced water.

In this prior art and its original (chemical) applications, a steam-slurry interface 648A is maintained in the vapor drum 642 above the heating element 604, to create a hydro-static head for boiling suppression in the heating element 604.

Feed water solution 606 enters from the bottom of the heating element 604, heated by hot heat-exchange medium 610, and starts to boil at the heating tube exits because of head loss. Flashing continues along the top connection pipe 646 until the vapor drum 642.

Condensed vapor and un-vaporized liquid fall to a lower portion of the vapor drum 642 and accumulate therein. The accumulated liquid including condensed water, is discharged from the vapor drum 642, and splits into a circulation stream 644 which is pumped by a recirculation pump 645 back to the heating element 604 and a blowdown discharge stream 650.

When using such a prior-art, FCRFLTV evaporator 640 for processing produced water, the flashing would produce fine scales, salts and other solids, and quickly plug the evaporator 640 due to the high levels of scaling compounds and excessive nucleation.

FIG. 11 is an exemplary illustration on how the FCR-FLTV evaporator is used in steam generation and blowdown concentration. Neither the evaporator 424 nor the crystallizer 530 are expected to last long unless the fouling-resistant features disclosed herein (see FIGS. 13 to 15C) are incorporated thereinto.

In the following, a new fouling-resistant evaporator is described in another embodiment of the present disclosure. The fouling-resistant evaporator may be used for generating high-pressure steam from the produced water that contains scaling compounds. The evaporator is immune to a satisfactory extent, from fouling/salting/scaling at a large evaporation-to-feed ratio of about 60% to about 80%.

Figure 13:
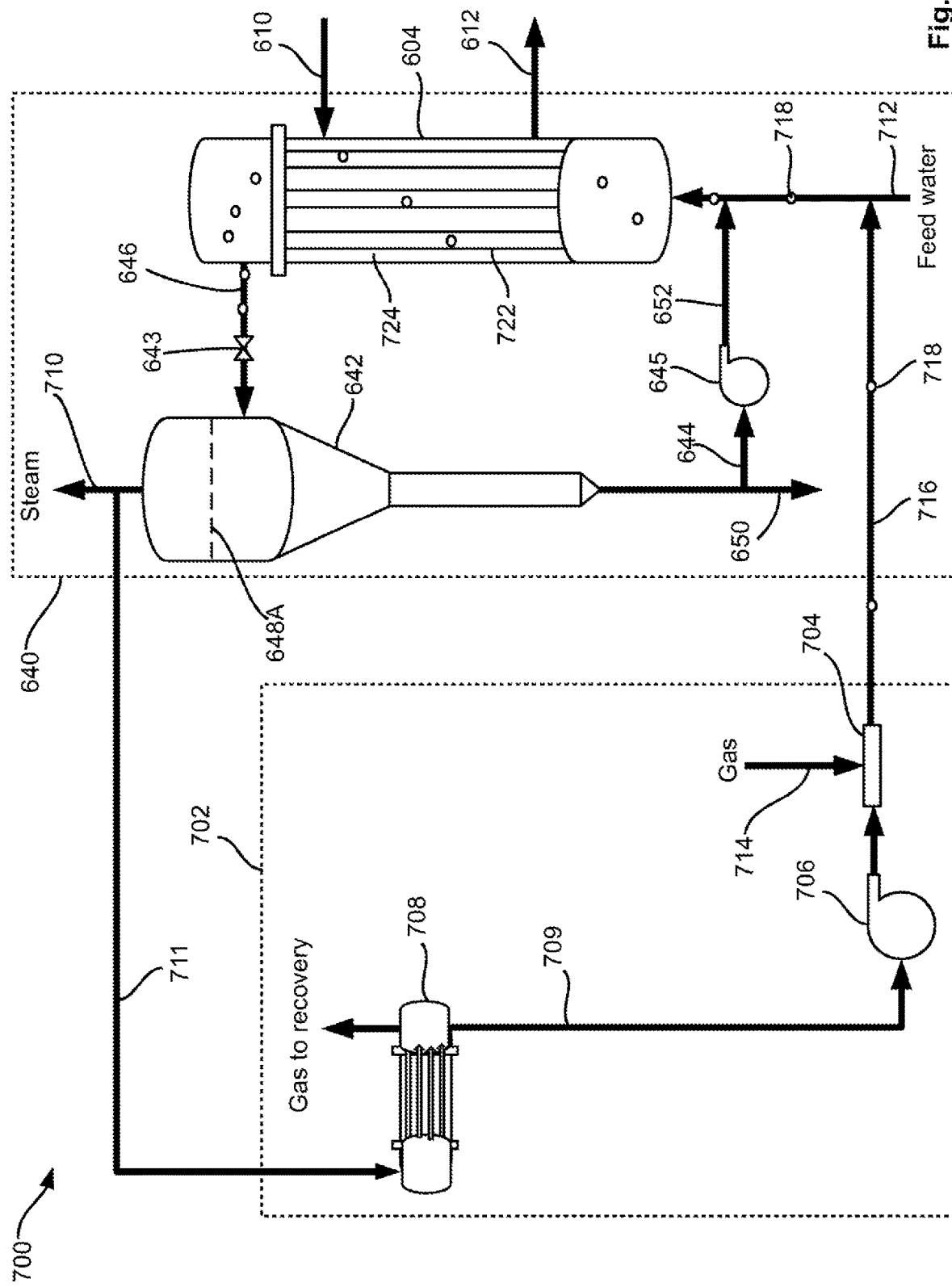
FIG. 13 is a schematic diagram of a high-pressure gas-inter-cyclic (GIC) evaporator having a sparger/pump assembly, according to one embodiment of this disclosure.

FIG. 13 is a schematic diagram of an HP, gas inter-cyclic (GIC) evaporator 700 having a sparger/pump assembly, according to this embodiment. The HP GIC evaporator 700 disclosed herein may be used as the HP evaporator 424 in the process 400.

The disclosed evaporator alters the FCRFLTV evaporators by introducing high density bubbles to the heating element resulting in a fouling-resistant evaporator capable of generating high-pressure steam.

As shown, the GIC evaporator 700 comprises an FCR-FLTV evaporator 640 for steam generation, and a bubble creation assembly 702 for generating bubbles 718 in a stream fed into the FCRFLTC evaporator 640. In the FCR-FLTV evaporator 640, the heating element 604 may be integrated with the vapor drum 642, or may be separated therefrom but in fluid communication therewith, as described above.

As will be described in more detail later, bubbles 718 are generated by injecting a suitable gas-phase substance 714 such as a non-condensable gas and/or a condensable gas or steam, into a stream to form bubbles 718 therein. An example of non-condensable gas is hydrocarbon gas such as methane, ethane, and the like. Suitable examples of condensable gas include vapor of a suitable solvent, such as liquefied petroleum gas, propane, and/or steam.

The heating element 604 comprises one or more vertical heating tubes 722 forming a liquid channel for receiving feed water 712 and bubble-mixed water stream 716 (described later) injected from the bottom thereof via an inlet nozzle (not shown). A heating channel 724 on the outer surface of the vertical heating tubes 722 receives heat-exchange medium 610 such as hot oil for heating the fluid in the heating tubes 722. After heat exchange, the temperature-reduced heat-exchange medium 612 is discharged from the evaporator 600, and is reheated by an energy source (not shown).

The GIC evaporator 700 is to use gas bubbles 718 in combination with a large blowdown circulation 652 and a pressure-letdown device 643 to effectively mitigate and self-remove scales and other precipitates in the evaporator 640.

In this embodiment, gas in a form of micro-bubbles 718, is mixed with both the feed water 712 and the blowdown recirculation 652 in the bottom of the heating element 604, the bubble-mixed blowdown mixture then flows upwards in the heating tubes 722 to fluidize and remove the precipitates by contacting them with a large surface area of thick blowdown.

A pressure-letdown device 643 is installed on the top connection pipe 646, to withhold water from flashing in the entire heating tubes 722. While fine scales, salts, and other precipitates may form in the top connection pipe 646, particularly inside the throat of the pressure letdown device 643 due to the sudden flashing of the solution, bubbles 718 therein are also squeezed to collapse creating cavitation to self-remove these precipitates in situ.

The pressure-letdown device 643 may be a throttling valve, an orifice, a converging diffuser, or a converging-piping fitting. The pressure drop across the pressure letdown device 643 may be optimized with the blowdown recirculation rate to obtain the evaporation-to-feed ratio required. A low-pressure drop in combination with a high recirculation rate is always preferred as it leads to a mitigated scaling (i.e. by evaporation or induced by nucleation).

The energy needed for evaporation (flash) of the blowdown circulation is from both the hydraulic power of the pump 645 and the thermal heat input to the heating element 604.

The steam/water mixture exits the top connection pipe 646 and enters the vapor drum 642 for both steam generation and separation.

A steam/liquid interface 648A is maintained in the vapor drum 642 separating gas thereabove and liquid therebelow. In this embodiment, the steam/liquid interface 648A is maintained at a level above its inlet piping system including the pressure-letdown device 643 to allow flashing feed water into bulk liquid to further reduce the entrance turbulence and therefore, the nucleation scaling therein. The submerged entry also reduces salting as no super-saturation is generated.

A major portion 710 of the steam along with gas in equilibrium, is discharged from the vapor drum 642 and co-injected into the reservoir 102 for enhanced oil production.

In this embodiment, a small portion of the steam, denoted using reference numeral 711, may be branched off and fed to the bubble-creation assembly 702 for bubble generation.

As shown in FIG. 13, the bubble-creation assembly 702 comprises a sparger 704, a sparger pump 706, and a liquid source which in this embodiment, is a steam condenser 708. The steam 711 is fed to the steam condenser 708 to condense to water 709, which is then pumped to the sparger 704 via the sparger pump 706 for making clean sparger-motive liquid 709.

The hydrocarbon gas in the steam 711 will be separated in the steam condenser 708, and recovered in the produced gas or the vapor-recovery system (not shown) for use as fuel in the fired heater (508 in FIG. 11).

The sparger 704 receives the condensed water 709 and a high-pressure gas stream 714 such as hydrocarbon gas or other non-condensable gas or steam.

Inside the sparger 704, the high-pressure gas 714 from the suction of the sparger flows through either a porous tube or an annulus, where it encounters the high-speed motive water 709 and is sheared into micro-bubbles 718. The bubble-mixed water stream 716 is then injected into the heating element 604.

Figure 14:
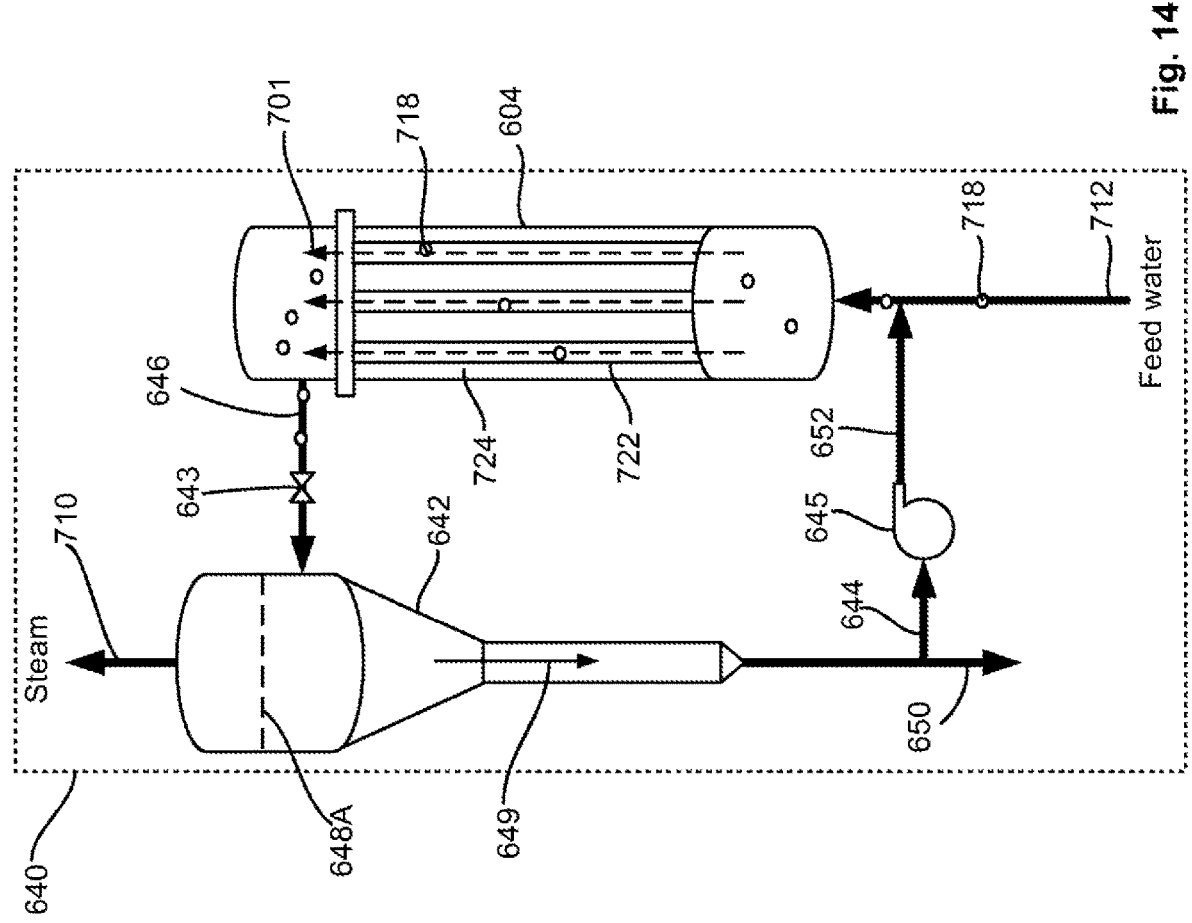
FIG. 14 is a schematic diagram of a portion of the high-pressure GIC evaporator of FIG. 13, showing the circulation of bubble-mixed liquid between the heating element and the vapor drum.

FIG. 14 shows the circulation of bubble-mixed liquid between the heating element 604 and the vapor drum 642 in the GIC evaporator 640.

In this embodiment, a pressure-letdown device 643 is added to a prior art FCRFLTV to create a pressure drop of about 1.0 MPa to about 3.0 MPa.

The bubbles 718 enter the heating element 604 from bottom and move upwards (indicated by arrows 701) inside the heating tubes 722. The bubbles 718 then collapse inside the top connection piping 646 across the pressure-letdown device 643 due to the contraction in the pipe.

There will be few bubbles after the letdown device 643, although gas remains in equilibrium with the high-pressure steam 710 and the blowdown 649, moving up and down, respectively as shown.

Condensed vapor and un-vaporized liquid fall to a lower portion of the vapor drum 642 (indicated by arrow 649).

Figure 15A:
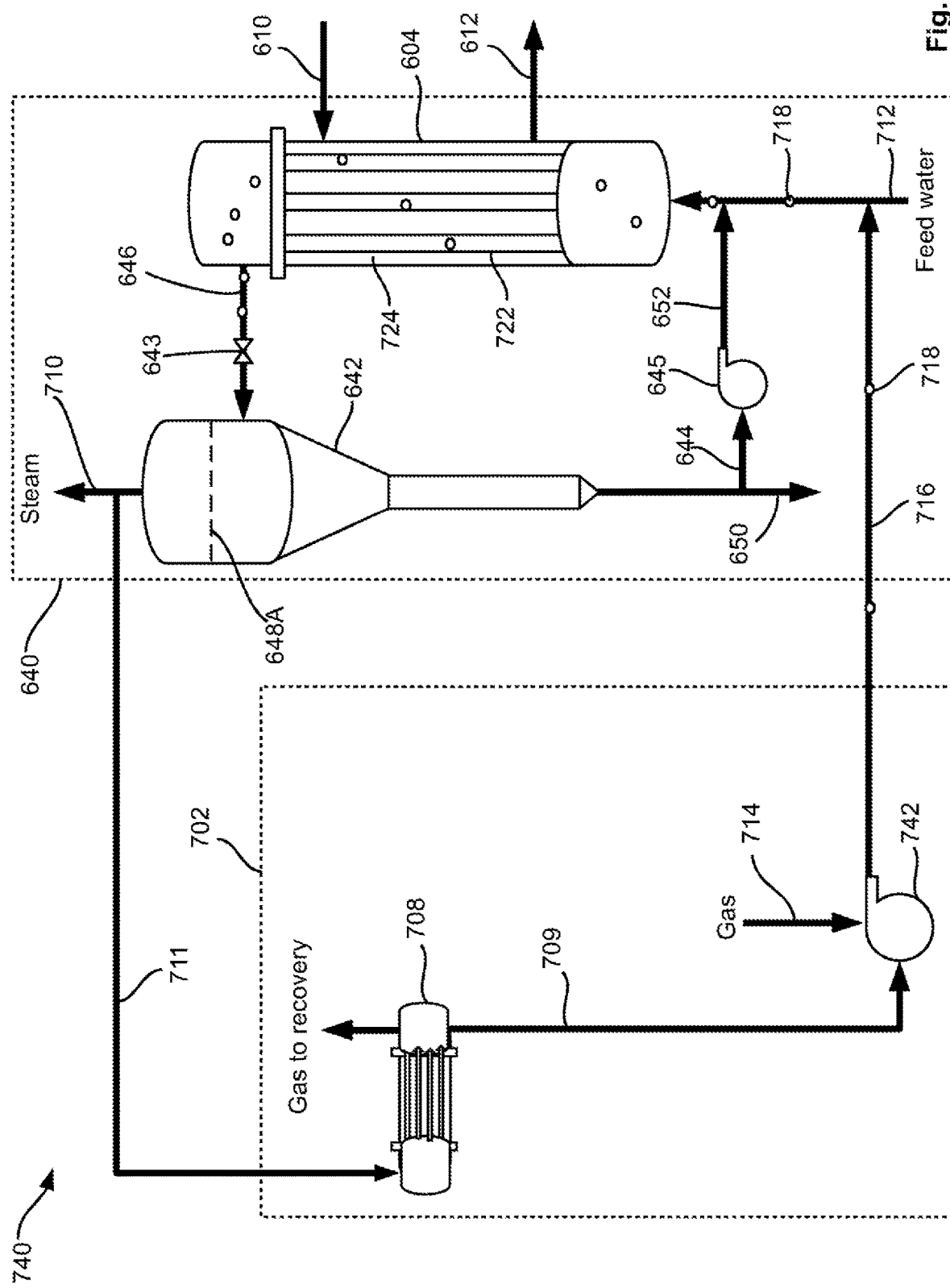
FIG. 15A is a schematic diagram of a high-pressure GIC evaporator having a bubble pump and using condensed steam for bubble generation, according to an alternative embodiment of this disclosure.

FIG. 15A is a schematic diagram of an HP GIC evaporator 740 having a bubble pump and using condensed steam for bubble generation according to an alternative embodiment of this disclosure. The HP GIC evaporator 740 disclosed herein may be used as the HP evaporator 424 in the process 400 under the non-condensable gas co-injection, an enhanced oil recovery method for oil extraction.

The GIC evaporator 740 is similar to the evaporator 700 of FIG. 13 except that in this embodiment, the evaporator 740 does not comprise a sparger. Instead, the evaporator 740 comprises a bubble pump 742 receiving water 709 from the condenser 708 and injecting gas 714 into the casing of the pump 742 in which gas is sheared into high-density micro-bubbles for generating bubble-mixed water stream 716.

Figure 15B:
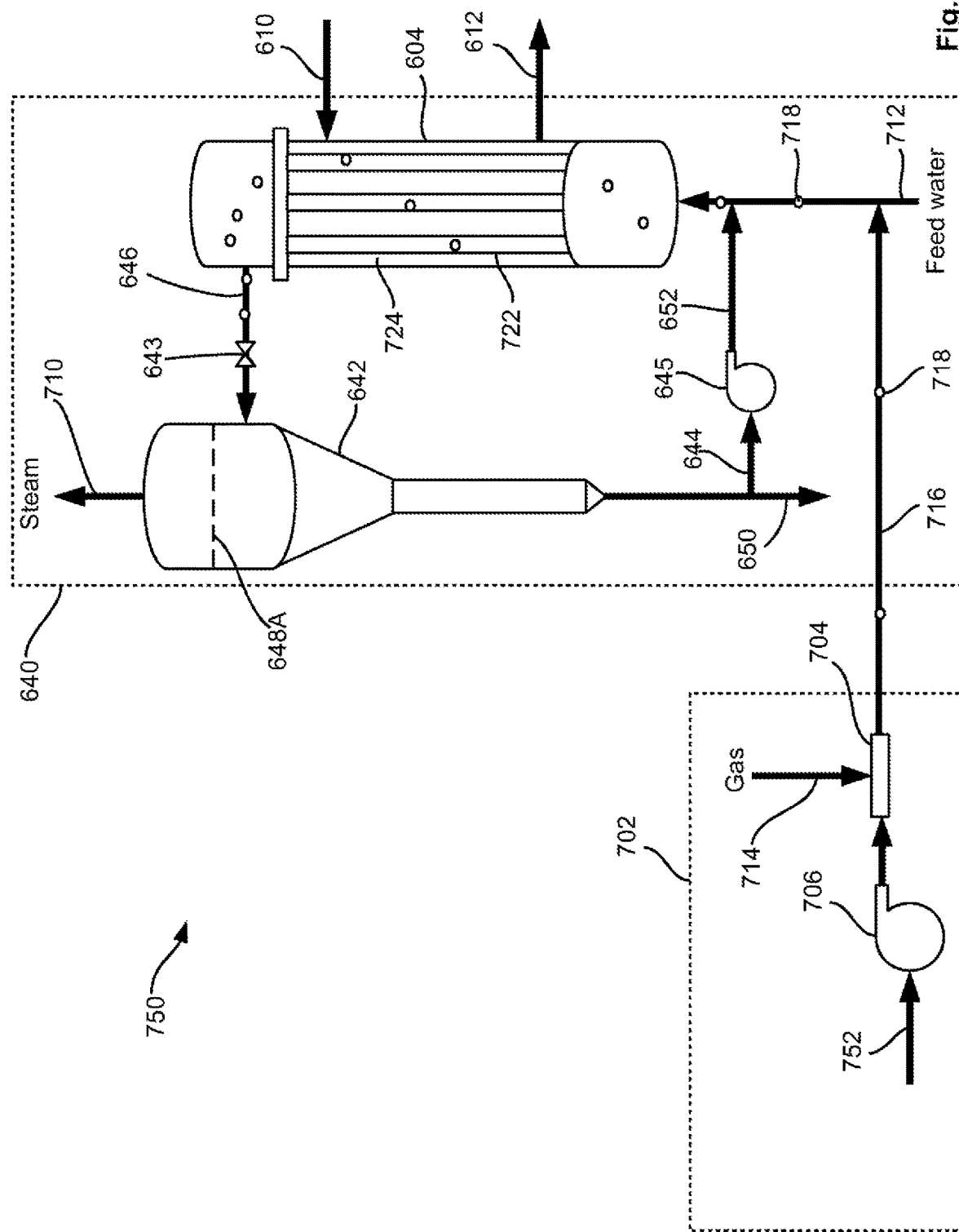
FIG. 15B is a schematic diagram of high-pressure GIC evaporator using an external water source for bubble generation, according to yet another embodiment of this disclosure.

FIG. 15B is a schematic diagram of an HP GIC evaporator 750 using an external water source for bubble generation according to yet another embodiment of this disclosure. The HP GIC evaporator 740 disclosed herein may be used as the HP evaporator 424 in the process 400 under the non-condensable gas co-injection, an enhanced oil recovery method for oil extraction.

The GIC evaporator 750 is similar to the evaporator 700 of FIG. 13 except that, in this embodiment, the evaporator 750 does not use water condensed from the evaporator vapor drum 642. Instead, water 752 from an external water source (not shown) is fed into the sparger 704 via a sparger pump 706 for generating water stream 716 with micro bubbles 718 mixed therein.

This scheme may be applicable when a portion, or all the evaporator feed water 712, the evaporator make up water 442, and/or the recovered steam condensate 532 is used for bubble generation.

Figure 15C:
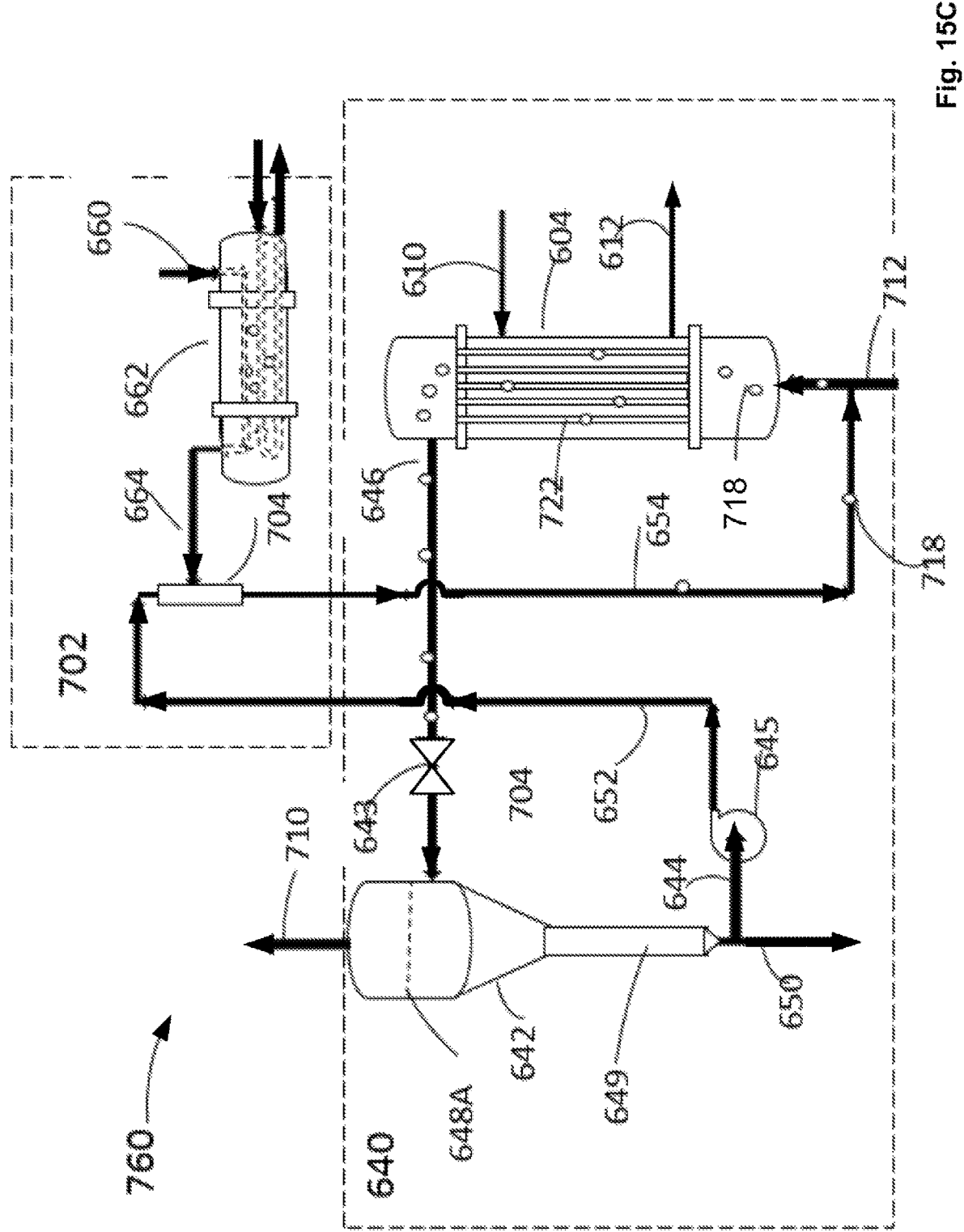
FIG. 15C is a schematic diagram of high-pressure GIC evaporator and using the blowdown circulation and the solvent vapor for bubble generation, according to still another embodiment of this disclosure.

FIG. 15C is a schematic diagram of an HP GIC evaporator 760 using the blowdown circulation and the solvent vapor for bubble generation according to still another embodiment of this disclosure.

The HP GIC evaporator 760 disclosed herein may be used as the HP evaporator 424 in the process 400 under the solvent-assisted oil extraction.

In this embodiment, solvent vapor 664 after being used for removal of scales and other solids in situ in the evaporator 760, remains in equilibrium with the high-pressure steam 710 thereafter and flows to the reservoir 102 to enhance the reservoir performance.

The GIC evaporator 760 is similar to the evaporator 750 of FIG. 15B except that, instead of using an external water source and non-condensable gas, the evaporator's blowdown circulation 652 and a solvent stream 664 are mixed in the sparger 704 to create a circulation stream 654 with solvent micro-bubbles 718 therein. The same arrangement can be used for the non-condensable gas co-injection by replacing the condensable solvent vapor 664 with a non-condensable gas.

As can be seen, the bubble-mixed blowdown stream 654 is combined with the evaporator feed water 712 and fed into the heating element 604 from the bottom. The solvent bubbles 718 then flow upwards, interacting with scales and other solid precipitates and clean them in the same manner as the non-condensable gas (see FIG. 13). Thus, the description of the cleaning process relates to the description of FIG. 13, and is not repeated here.

In this embodiment, solvent 660 required for solvent-assisted extraction is pumped first into a solvent vaporizer 662 where it is heated, vaporized, and "self-compressed" to supercritical conditions with at least pressure, or both pressure and temperature higher than its critical point. The solvent at the supercritical conditions is then delivered to the suction of the sparger 704 for bubble generation.

The solvent vaporizer 662 can be traditional shell and tube reboiler type, an intermediate-fluid-vaporizer type, or the like.

The blowdown recirculation pump 645 serves as both the blowdown recirculation pump in the GIC evaporator 760 and the motive pump to the sparger 704.

In this embodiment, the blowdown recirculation 652 passes a sparger 704 before the heating element 604. In an alternative embodiment, the blowdown circulation 652 is heated in the heating element 604 prior to generating bubbles in a sparger 704. In various embodiments, the sparger 704 is located upstream of the pressure-letdown device 643 in order to collapse the bubbles 718 to clean precipitates in situ.

Figure 16:
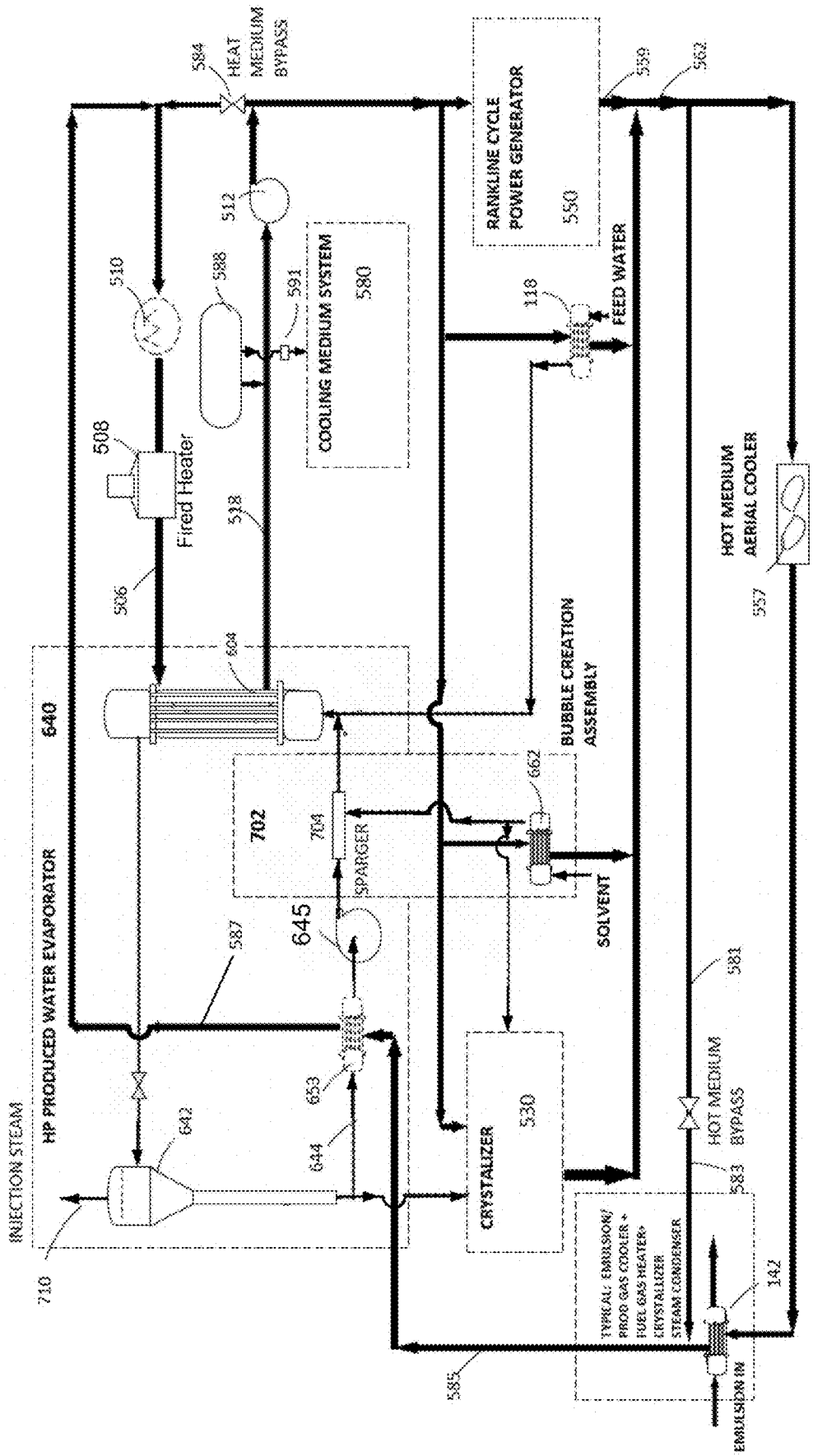
FIG. 16 is a plant-wide heating and cooling medium system of the process of FIG. 9, according to one embodiment of this disclosure.

The solvent vaporizer 662 is arranged in a parallel arrangement with the crystallizer heating element 521 and the optional produced water preheater 531, all receive heating supply from the heat-exchange medium stream 518 at the outlet of the evaporator 604 (see FIG. 16).

In this embodiment, the sparger 704 is at the highest elevation to allow draining and purging the sparger with high-pressure non-condensable gas before and after the shutdown to avoid plugging the sparger 704 when the solvent vapor 664 is condensed, thereby creating vacuum and sucking in the dirty blowdown.

Those skilled in art appreciate that both the high-pressure evaporator 640 and the crystallizer 530 receive solvent bubbles. Furthermore, solvent bubbles may be generated using a water source other than the blowdown circulation 652, to allow the bubble mixed water to be injected into top of heating element 604, or into the inlet of top connection pipe 646.

In FIG. 15C, a prior art FCRFLTV evaporator 640 is upgraded by adding the bubble-creation assembly and the pressure-letdown device disclosed herein to make the FCR-FLTV evaporator a fouling-resistant evaporator, capable of generating high-pressure steam in one step with no feed water softening. In some alternative embodiments, other suitable types of evaporators may alternatively be used with the same upgrades to achieve similar results. Such evaporators including but not limited to, forced-circulation falling-film evaporators, forced-circulated rising/falling film evaporators, multiple-effect evaporators, and the like, whether in a horizontal or a vertical orientation.

FIG. 16 is a plant-wide heating and cooling medium system of process 400, according to another embodiment of this disclosure.

In this embodiment, the high-temperature heat-exchange medium 506 from a fired heater 508 is circulated to a high-pressure GIC evaporator 640 to generate high-pressure injection steam 710. The heat-exchange medium 506 gives up heat and exits the heating element 604 as stream 518.

The heat-exchange medium 518 with a reduced temperature is then pumped to an organic Rankine cycle (ORC) power generator 550, in which the high-grade heat is converted to electricity at the best efficiency possible as a consequence of the high temperature of about 240° C. to about 300° C. maintained in stream 518.

The exhaust heat exchange medium 559 leaving the ORC 550 has a temperature of about 140° C.

In some embodiments, the ORC is in a parallel arrangement with other process heaters such as the optional produced water preheater 531, the solvent vaporizer 662, and the blowdown crystallizer 530.

The heat-exchange medium 559 at the exit of the ORC is recombined with the exhausts from all its parallel heaters to form a hot medium stream 562, cooled in a hot medium aerial cooler 557 to about 130° C., and used for cooling the inlet emulsion in the inlet-emulsion cooler 142.

The cold/hot medium, at 130° C., is also be used for cooling the inlet produced gas, for condensing the low pressure steam in the crystallizer 530, and for heating the plant fuel gas supply.

The outflows from all the coolers and heaters are then recombined with the remainder and excess of heat-exchange medium 583 to obtain a recombined stream 585. The excess heat-exchange medium 583 joins the outflows via a cooling bypass 581.

In some embodiments, the recombined heat-exchange medium 585 is sent to an optional blowdown recirculation cooler 653 inside the GIC evaporator 640.

The blowdown recirculation cooler 653 is an option if the constructability of the blowdown recirculation pump 645 cannot match the operating temperature required for the evaporator. Obviously, the blowdown-recirculation cooler 653 can be omitted if an adequate pump suitable for corrosive and abrasive services can be sourced for high-temperature and high-pressure ratings.

Again, the recombined heat-exchange medium 585 picks up heat from the blowdown concentrate recirculated 644, and exits the cooler at an elevated temperature. The temperature-elevated heat medium 587 then returns to the solar collector 510, or if a solar collector is not used, or if it does not exist, returns to the fired heater 508 for reheating.

A heat medium bypass 584 is used, to divert the excess heat-exchange medium to the solar collector 510 or to the fired heater 508, in case of low heating demand from the ORC 550 and its parallel heaters.

There is a heat medium expansion drum 588 at the suction of the heat medium recirculation pump 512 to accommodate the volume increase, and to vent off entrained gas in the system.

The said heat medium expansion drum 588 can be shared with the cooling medium system 580 through a restriction orifice 591 or equivalent, to also provide expansion need for the cooling medium system. The cooling medium loop uses the same heat transfer fluid as heat medium described above although they are operated at different temperature ranges.

The purpose of the cooling medium is to obtain and circulate a low-temperature cooling source of about 45° C. for recovery of produced gas, sales oil, low-pressure steam, and for trim-cooling the inlet emulsion. The cooling-medium system is out of the scope of this disclosure, and its detail is omitted herein.

The method reverses the sequence of traditional heat integration by first tapping high-grade heat for power generation for the best conversion efficiency, the temperature-reduced heat-exchange medium then picks up heat from the hot production and low-pressure steam to recover most of its initial enthalpy.

This method avoids a second heat transfer fluid such as glycol. In a winter shutdown, the fired heater 508 with a reduced output, would continue to produce both power and low-f grade winterization heat through the ROC, to further eliminate the winterization fired heater from the plant utility along with the diesel emergency power generator.

Although embodiments have been described above with reference to the accompanying drawings, those of skill in the art will appreciate that variations and modifications may be made without departing from the scope thereof as defined by the appended claims.

What is claimed is:

1. An evaporator operable at a pressure higher than atmospheric pressure for receiving a liquid stream and generating steam therefrom, the liquid stream comprising at least water, the evaporator comprising:
    a heating element comprising a liquid channel for receiving the liquid stream, and a heating channel for directing a high-temperature heat-exchange medium therethrough to heat the liquid stream in the liquid channel via heat exchange between the heating channel and the liquid channel;
    a vapor drum for receiving the heated liquid stream from the heating element via a top connection pipe, and for generating steam from the heated liquid stream, the vapor drum comprising a steam outlet for discharging a generated steam, and a blowdown outlet for discharging a blowdown concentrate comprising un-vaporized liquid and impurities;
    a heating source for heating said heat-exchange medium, the heating source comprising a solar power collector;
    a blowdown recirculation cooler coupled to the blowdown outlet;
    a hot-medium aerial cooler for cooling the heat-exchange medium; and
    a heat-exchange medium circulation path for:
        heating the heat-exchange medium by the heating source and directing the heat-exchange medium into the heating channel of the heating element;
        discharging the heat-exchange medium from the heating element;
        directing the heat-exchange medium discharged from the heating element to the hot-medium aerial cooler for cooling the heat-exchange medium;
        directing the heat-exchange medium discharged from the hot-medium aerial cooler to the blowdown recirculation cooler for cooling the blowdown concentrate, and
        returning the heat-exchange medium discharged from the blowdown recirculation cooler to the heating source.

2. The evaporator of claim 1, wherein the heat-exchange medium circulation path is further configured for:
    directing the heat-exchange medium to a series of heat exchangers for a plant-wide heat integration.

3. The evaporator of claim 2, wherein the heat-exchange medium circulation path is further configured for:
    directing the heat-exchange medium to the series of heat exchangers for a plant-wide heat integration before directing the heat-exchange medium to the blowdown recirculation cooler.

4. The evaporator of claim 1 further comprising:
    a bubble-creation assembly for generating bubbles using a gas-phase substance, and injecting generated bubbles into the heating element for self-removal of scales and other deposits in the evaporator.

5. The evaporator of claim 4 further comprising:
    a water circulation path for recycling at least a portion of the steam from the steam outlet of the vapor drum to the bubble-creation assembly for condensation and acting as a motive water stream for feeding into the bubble-creation assembly for generating bubbles therein and feeding into the heating element;
    wherein the bubble-creation assembly comprises a steam condenser for condensing the recycled steam into the motive water stream.

6. The evaporator of claim 5, wherein the heat-exchange medium circulation path is further configured for:
    directing the heat-exchange medium to the steam condenser for condensing the recycled steam into the motive water stream; and
    returning the heat-exchange medium discharged from the steam condenser to the heating source.

7. The evaporator of claim 6, wherein the heat-exchange medium circulation path is further configured for:
    directing the heat-exchange medium to a series of heat exchangers for a plant-wide heat integration before directing the heat-exchange medium to the steam condenser and before directing the heat-exchange medium to the blowdown recirculation cooler.

8. The evaporator of claim 2, wherein the series of heat exchangers comprises at least one of a preheater for preheating said liquid stream, a blowdown crystallizer, and an organic Rankine cycle power generator.

9. The evaporator of claim 7, wherein the gas-phase substance is a solvent vapor; and
    wherein the series of heat exchangers comprises at least one of a preheater for preheating said liquid stream, a solvent vaporizer for generating the solvent vapor, a blowdown crystallizer, and an organic Rankine cycle power generator.

* * * * *